US012034264B2

(12) United States Patent
Burris et al.

(10) Patent No.: US 12,034,264 B2
(45) Date of Patent: *Jul. 9, 2024

(54) COAXIAL CABLE CONNECTOR ASSEMBLIES WITH OUTER CONDUCTOR ENGAGEMENT FEATURES AND METHODS FOR USING THE SAME

(71) Applicant: Corning Optical Communications RF LLC, Glendale, AZ (US)

(72) Inventors: Donald Andrew Burris, Peoria, AZ (US); David Jeffrey Malouf, Surprise, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,589

(22) Filed: Mar. 31, 2022

(65) Prior Publication Data

US 2022/0320761 A1 Oct. 6, 2022

Related U.S. Application Data

(60) Provisional application No. 63/169,159, filed on Mar. 31, 2021.

(51) Int. Cl.
*H01R 9/05* (2006.01)

(52) U.S. Cl.
CPC ......... *H01R 9/0524* (2013.01); *H01R 9/0521* (2013.01)

(58) Field of Classification Search
CPC . H01R 9/0524; H01R 9/0521; H01R 2103/00
See application file for complete search history.

(56) References Cited

U.S. PATENT DOCUMENTS

| | | | |
|---|---|---|---|
| 331,169 | A | 11/1885 | Thomas |
| 346,958 | A | 8/1886 | Stone |
| 459,951 | A | 9/1891 | Warner |

(Continued)

FOREIGN PATENT DOCUMENTS

| | | | |
|---|---|---|---|
| CA | 2096710 | A1 | 11/1994 |
| CN | 201149936 | Y | 11/2008 |

(Continued)

*Primary Examiner* — Briggitte R. Hammond
(74) *Attorney, Agent, or Firm* — Tamika A. Crawl-Bey

(57) ABSTRACT

A coaxial cable connector assembly comprising a rear body comprising an outer body member and an inner body member, wherein the rear body is positionable in a disengaged position and an engaged position, and a coupler rotatably engaged with and positioned forward of the rear body, wherein the coupler defines an inner channel extending through the coupler between a front portion of the coupler and a rear portion of the coupler positioned opposite the front portion, a thread at the front portion of the coupler, a nominal portion defining a nominal inner span along the inner channel, and an outer conductor engagement portion that tapers inwardly from the nominal portion that extends forwardly along the inner channel to the front portion of the coupler, wherein the outer conductor engagement portion is structurally configured to contact an outer conductor of the coaxial cable.

17 Claims, 5 Drawing Sheets

(56) References Cited

U.S. PATENT DOCUMENTS

| | | | |
|---|---|---|---|
| 589,216 | A | 8/1897 | Mokee |
| 1,371,742 | A | 3/1921 | Dringman |
| 1,488,175 | A | 3/1924 | Strandell |
| 1,667,485 | A | 4/1928 | MacDonald |
| 1,766,869 | A | 6/1930 | Austin |
| 1,801,999 | A | 4/1931 | Bowman |
| 1,885,761 | A | 11/1932 | Peirce, Jr. |
| 1,959,302 | A | 5/1934 | Paige |
| 2,013,526 | A | 9/1935 | Schmitt |
| 2,059,920 | A | 11/1936 | Weatherhead, Jr. |
| 2,102,495 | A | 12/1937 | England |
| 2,258,528 | A | 10/1941 | Wurzburger |
| 2,258,737 | A | 10/1941 | Browne |
| 2,325,549 | A | 7/1943 | Ryzowitz |
| 2,480,963 | A | 9/1949 | Quinn |
| 2,544,654 | A | 3/1951 | Brown |
| 2,549,647 | A | 4/1951 | Turenne |
| 2,665,729 | A | 1/1954 | Terry |
| 2,694,187 | A | 11/1954 | Nash |
| 2,705,652 | A | 4/1955 | Kaiser |
| 2,743,505 | A | 5/1956 | Hill |
| 2,754,487 | A | 7/1956 | Carr et al. |
| 2,755,331 | A | 7/1956 | Melcher |
| 2,757,351 | A | 7/1956 | Klostermann |
| 2,762,025 | A | 9/1956 | Melcher |
| 2,785,384 | A | 3/1957 | Wickesser |
| 2,805,399 | A | 9/1957 | Leeper |
| 2,816,949 | A | 12/1957 | Curtiss |
| 2,870,420 | A | 1/1959 | Joseph, V |
| 2,878,039 | A | 3/1959 | Hoegee et al. |
| 2,881,406 | A | 4/1959 | Arson |
| 2,963,536 | A | 12/1960 | Kokalas |
| 3,001,169 | A | 9/1961 | Blonder |
| 3,015,794 | A | 1/1962 | Kishbaugh |
| 3,051,925 | A | 8/1962 | Felts |
| 3,091,748 | A | 5/1963 | Takes et al. |
| 3,094,364 | A | 6/1963 | Liagg |
| 3,103,548 | A | 9/1963 | Concelman |
| 3,106,548 | A | 10/1963 | Lavalou |
| 3,140,106 | A | 7/1964 | Thomas et al. |
| 3,161,451 | A | 12/1964 | Neidecker |
| 3,184,706 | A | 5/1965 | Atkins |
| 3,193,309 | A | 7/1965 | Morris |
| 3,194,292 | A | 7/1965 | Borowsky |
| 3,196,382 | A | 7/1965 | Morello, Jr. |
| 3,206,540 | A | 9/1965 | Cohen |
| 3,245,027 | A | 4/1966 | Ziegler, Jr. |
| 3,275,913 | A | 9/1966 | Blanchard et al. |
| 3,278,890 | A | 10/1966 | Cooney |
| 3,281,756 | A | 10/1966 | Francis et al. |
| 3,281,757 | A | 10/1966 | Francois |
| 3,290,069 | A | 12/1966 | Davis |
| 3,292,136 | A | 12/1966 | Somerset |
| 3,320,575 | A | 5/1967 | Brown et al. |
| 3,321,732 | A | 5/1967 | Forney, Jr. |
| 3,336,563 | A | 8/1967 | Hyslop |
| 3,348,186 | A | 10/1967 | Rosen |
| 3,350,667 | A | 10/1967 | Shreve |
| 3,350,677 | A | 10/1967 | Daum |
| 3,355,698 | A | 11/1967 | Keller |
| 3,372,364 | A | 3/1968 | Francis et al. |
| 3,373,243 | A | 3/1968 | Janowiak et al. |
| 3,390,374 | A | 6/1968 | Forney, Jr. |
| 3,406,373 | A | 10/1968 | Forney, Jr. |
| 3,430,184 | A | 2/1969 | Acord |
| 3,448,430 | A | 6/1969 | Kelly |
| 3,453,376 | A | 7/1969 | Ziegler et al. |
| 3,465,281 | A | 9/1969 | Florer |
| 3,475,545 | A | 10/1969 | Stark et al. |
| 3,494,400 | A | 2/1970 | McCoy et al. |
| 3,498,647 | A | 3/1970 | Schroder |
| 3,499,671 | A | 3/1970 | Osborne |
| 3,501,737 | A | 3/1970 | Harris et al. |
| 3,517,373 | A | 6/1970 | Jamon |
| 3,526,871 | A | 9/1970 | Hobart |
| 3,533,051 | A | 10/1970 | Ziegler, Jr. |
| 3,537,065 | A | 10/1970 | Winston |
| 3,544,705 | A | 12/1970 | Winston |
| 3,551,882 | A | 12/1970 | Francis |
| 3,564,487 | A | 2/1971 | Upstone et al. |
| 3,587,033 | A | 6/1971 | Brorein et al. |
| 3,596,933 | A | 8/1971 | Luckenbill |
| 3,601,776 | A | 8/1971 | Curl |
| 3,603,912 | A | 9/1971 | Kelly |
| 3,614,711 | A | 10/1971 | Anderson et al. |
| 3,622,952 | A | 11/1971 | Hilbert |
| 3,629,792 | A | 12/1971 | Dorrell |
| 3,633,150 | A | 1/1972 | Swartz |
| 3,646,502 | A | 2/1972 | Hutter et al. |
| 3,663,926 | A | 5/1972 | Brandt |
| 3,665,371 | A | 5/1972 | Cripps |
| 3,668,612 | A | 6/1972 | Nepovim |
| 3,669,472 | A | 6/1972 | Nadsady |
| 3,671,922 | A | 6/1972 | Zerlin et al. |
| 3,671,926 | A | 6/1972 | Zdenek |
| 3,678,444 | A | 7/1972 | Stevens et al. |
| 3,678,445 | A | 7/1972 | Brancaleone |
| 3,680,034 | A | 7/1972 | Chow et al. |
| 3,681,739 | A | 8/1972 | Kornick |
| 3,683,320 | A | 8/1972 | Woods et al. |
| 3,686,623 | A | 8/1972 | Nijman |
| 3,694,792 | A | 9/1972 | Wallo |
| 3,694,793 | A | 9/1972 | Concelman |
| 3,697,930 | A | 10/1972 | Shirey |
| 3,706,958 | A | 12/1972 | Blanchenot |
| 3,708,186 | A | 1/1973 | Takagi et al. |
| 3,710,005 | A | 1/1973 | French |
| 3,739,076 | A | 6/1973 | Schwartz |
| 3,744,007 | A | 7/1973 | Horak |
| 3,744,011 | A | 7/1973 | Blanchenot |
| 3,761,870 | A | 9/1973 | Drezin et al. |
| 3,778,535 | A | 12/1973 | Forney |
| 3,781,762 | A | 12/1973 | Quackenbush |
| 3,781,898 | A | 12/1973 | Holloway |
| 3,783,178 | A | 1/1974 | Philibert et al. |
| 3,787,796 | A | 1/1974 | Barr |
| 3,793,610 | A | 2/1974 | Brishka |
| 3,798,589 | A | 3/1974 | Deardurff |
| 3,808,580 | A | 4/1974 | Johnson |
| 3,810,076 | A | 5/1974 | Hutter |
| 3,824,026 | A | 7/1974 | Gaskins |
| 3,835,443 | A | 9/1974 | Arnold et al. |
| 3,836,700 | A | 9/1974 | Niemeyer |
| 3,845,453 | A | 10/1974 | Hemmer |
| 3,846,738 | A | 11/1974 | Nepovim |
| 3,847,463 | A | 11/1974 | Hayward et al. |
| 3,854,003 | A | 12/1974 | Duret |
| 3,854,789 | A | 12/1974 | Kaplan |
| 3,858,156 | A | 12/1974 | Zarro |
| 3,879,102 | A | 4/1975 | Horak |
| 3,886,301 | A | 5/1975 | Cronin et al. |
| 3,907,335 | A | 9/1975 | Burge et al. |
| 3,907,399 | A | 9/1975 | Spinner |
| 3,910,673 | A | 10/1975 | Stokes |
| 3,915,539 | A | 10/1975 | Collins |
| 3,936,132 | A | 2/1976 | Hutter |
| 3,937,547 | A | 2/1976 | Lee-Kemp |
| 3,953,097 | A | 4/1976 | Graham |
| 3,960,428 | A | 6/1976 | Naus et al. |
| 3,963,320 | A | 6/1976 | Spinner |
| 3,963,321 | A | 6/1976 | Burger et al. |
| 3,970,355 | A | 7/1976 | Pitschi |
| 3,972,013 | A | 7/1976 | Shapiro |
| 3,976,352 | A | 8/1976 | Spinner |
| 3,980,805 | A | 9/1976 | Lipari |
| 3,985,418 | A | 10/1976 | Spinner |
| 3,986,736 | A | 10/1976 | Takagi et al. |
| 4,012,105 | A | 3/1977 | Biddle |
| 4,017,139 | A | 4/1977 | Nelson |
| 4,022,966 | A | 5/1977 | Gajajiva |
| 4,030,742 | A | 6/1977 | Eidelberg et al. |
| 4,030,798 | A | 6/1977 | Paoli |
| 4,032,177 | A | 6/1977 | Anderson |
| 4,045,706 | A | 8/1977 | Daffner et al. |

(56) References Cited

U.S. PATENT DOCUMENTS 4,046,451 A 9/1977 Juds et al.
4,053,200 A 10/1977 Pugner
4,056,043 A 11/1977 Sriramamurty et al.
4,059,330 A 11/1977 Shirey
4,079,343 A 3/1978 Nijman
4,082,404 A 4/1978 Flatt
4,090,028 A 5/1978 Vontobel
4,093,335 A 6/1978 Schwartz et al.
4,100,943 A 7/1978 Terada et al.
4,106,839 A 8/1978 Cooper
4,109,126 A 8/1978 Halbeck
4,118,097 A 10/1978 Budnick
4,125,308 A 11/1978 Schilling
4,126,372 A 11/1978 Hashimoto et al.
4,131,332 A 12/1978 Hogendobler et al.
4,136,897 A 1/1979 Haluch
4,150,250 A 4/1979 Lundeberg
4,153,320 A 5/1979 Townshend
4,156,554 A 5/1979 Aujla
4,165,911 A 8/1979 Laudig
4,168,921 A 9/1979 Blanchard
4,173,385 A 11/1979 Fenn et al.
4,174,875 A 11/1979 Bayha et al.
4,187,481 A 2/1980 Boutros
4,193,655 A 3/1980 Hermann, Jr.
4,194,338 A 3/1980 Trafton
4,197,628 A 4/1980 Conti et al.
4,206,963 A 6/1980 English et al.
4,212,487 A 7/1980 Jones et al.
4,225,162 A 9/1980 Dola
4,227,765 A 10/1980 Neumann et al.
4,229,714 A 10/1980 Yu
4,239,318 A 12/1980 Schwartz
4,250,348 A 2/1981 Kitagawa
4,260,212 A 4/1981 Ritchie et al.
4,273,405 A 6/1981 Law
4,280,749 A 7/1981 Hemmer
4,285,564 A 8/1981 Spinner
4,290,663 A 9/1981 Fowler et al.
4,296,986 A 10/1981 Herrmann, Jr.
4,307,926 A 12/1981 Smith
4,309,050 A 1/1982 Legris
4,310,211 A 1/1982 Bunnell et al.
4,322,121 A 3/1982 Riches et al.
4,326,768 A 4/1982 Punako
4,326,769 A 4/1982 Dorsey et al.
4,334,730 A 6/1982 Colwell et al.
4,339,166 A 7/1982 Dayton
4,345,375 A 8/1982 Hayward
4,346,958 A 8/1982 Blanchard
4,354,721 A 10/1982 Luzzi
4,358,174 A 11/1982 Dreyer
4,373,767 A 2/1983 Cairns
4,389,081 A 6/1983 Gallusser et al.
4,400,050 A 8/1983 Hayward
4,407,529 A 10/1983 Holman
4,408,821 A 10/1983 Forney, Jr.
4,408,822 A 10/1983 Nikitas
4,412,717 A 11/1983 Monroe
4,421,377 A 12/1983 Spinner
4,426,127 A 1/1984 Kubota
4,428,639 A 1/1984 Hillis
4,444,453 A 4/1984 Kirby et al.
4,447,107 A 5/1984 Major et al.
4,452,503 A 6/1984 Forney, Jr.
4,456,323 A 6/1984 Pitcher et al.
4,459,881 A 7/1984 Hughes, Jr.
4,462,653 A 7/1984 Flederbach et al.
4,464,000 A 8/1984 Werth et al.
4,464,001 A 8/1984 Collins
4,469,386 A 9/1984 Ackerman
4,470,657 A 9/1984 Deacon
4,477,132 A 10/1984 Moser et al.
4,484,792 A 11/1984 Tengler et al.
4,484,796 A 11/1984 Sato et al.
4,490,576 A 12/1984 Bolante et al.
4,491,685 A 1/1985 Drew et al.
4,506,943 A 3/1985 Drogo
4,515,427 A 5/1985 Smit
4,525,017 A 6/1985 Schildkraut et al.
4,531,790 A 7/1985 Selvin
4,531,805 A 7/1985 Werth
4,533,191 A 8/1985 Blackwood
4,540,231 A 9/1985 Forney, Jr.
RE31,995 E 10/1985 Ball
4,545,633 A 10/1985 McGeary
4,545,637 A 10/1985 Bosshard et al.
4,553,877 A 11/1985 Edvardsen
4,575,274 A 3/1986 Hayward
4,580,862 A 4/1986 Johnson
4,580,865 A 4/1986 Fryberger
4,583,811 A 4/1986 McMills
4,585,289 A 4/1986 Bocher
4,588,246 A 5/1986 Schildkraut et al.
4,593,964 A 6/1986 Forney et al.
4,596,434 A 6/1986 Saba et al.
4,596,435 A 6/1986 Bickford
4,597,621 A 7/1986 Burns
4,598,959 A 7/1986 Selvin
4,598,961 A 7/1986 Cohen
4,600,263 A 7/1986 Dechamp et al.
4,613,199 A 9/1986 McGeary
4,614,390 A 9/1986 Baker
4,616,900 A 10/1986 Cairns
4,623,205 A 11/1986 Barron
4,632,487 A 12/1986 Wargula
4,634,213 A 1/1987 Larsson et al.
4,640,572 A 2/1987 Conlon
4,645,281 A 2/1987 Burger
4,647,135 A 3/1987 Reinhardt
4,650,228 A 3/1987 McMills et al.
4,655,159 A 4/1987 McMills
4,655,534 A 4/1987 Stursa
4,660,921 A 4/1987 Hauver
4,666,190 A 5/1987 Yamabe et al.
4,666,231 A 5/1987 Sheesley et al.
4,668,043 A 5/1987 Saba et al.
4,670,574 A 6/1987 Malcolm et al.
4,673,236 A 6/1987 Musolff et al.
4,674,809 A 6/1987 Hollyday et al.
4,674,818 A 6/1987 McMills et al.
4,676,577 A 6/1987 Szegda
4,682,832 A 7/1987 Punako et al.
4,684,201 A 8/1987 Hutter
4,688,876 A 8/1987 Morelli
4,688,878 A 8/1987 Cohen et al.
4,690,482 A 9/1987 Chamberland et al.
4,691,976 A 9/1987 Cowen
4,703,987 A 11/1987 Gallusser et al.
4,703,988 A 11/1987 Raux et al.
4,713,021 A 12/1987 Kobler
4,717,355 A 1/1988 Mattis
4,720,155 A 1/1988 Schildkraut et al.
4,728,301 A 3/1988 Hemmer et al.
4,734,050 A 3/1988 Negre et al.
4,734,666 A 3/1988 Ohya et al.
4,737,123 A 4/1988 Paler et al.
4,738,009 A 4/1988 Down et al.
4,738,628 A 4/1988 Rees
4,739,009 A 4/1988 Heide et al.
4,739,126 A 4/1988 Gutter et al.
4,746,305 A 5/1988 Nomura
4,747,656 A 5/1988 Miyahara et al.
4,747,786 A 5/1988 Hayashi et al.
4,749,821 A 6/1988 Linton et al.
4,755,152 A 7/1988 Elliot et al.
4,757,297 A 7/1988 Frawley
4,759,729 A 7/1988 Kemppainen et al.
4,761,146 A 8/1988 Sohoel
4,772,222 A 9/1988 Laudig et al.
4,789,355 A 12/1988 Lee
4,789,759 A 12/1988 Jones
4,795,360 A 1/1989 Newman et al.
4,797,120 A 1/1989 Ulery

(56) References Cited

U.S. PATENT DOCUMENTS

| | | | |
|---|---|---|---|
| 4,806,116 | A | 2/1989 | Ackerman |
| 4,807,891 | A | 2/1989 | Neher |
| 4,808,128 | A | 2/1989 | Werth |
| 4,810,017 | A | 3/1989 | Knak et al. |
| 4,813,886 | A | 3/1989 | Roos et al. |
| 4,820,185 | A | 4/1989 | Moulin |
| 4,834,675 | A | 5/1989 | Samchisen |
| 4,834,676 | A | 5/1989 | Tackett |
| 4,835,342 | A | 5/1989 | Guginsky |
| 4,836,580 | A | 6/1989 | Farrell |
| 4,836,801 | A | 6/1989 | Ramirez |
| 4,838,813 | A | 6/1989 | Pauza et al. |
| 4,846,731 | A | 7/1989 | Alwine |
| 4,854,893 | A | 8/1989 | Morris |
| 4,857,014 | A | 8/1989 | Alf et al. |
| 4,867,489 | A | 9/1989 | Patel |
| 4,867,706 | A | 9/1989 | Tang |
| 4,869,679 | A | 9/1989 | Szegda |
| 4,874,331 | A | 10/1989 | Iverson |
| 4,881,912 | A | 11/1989 | Thommen et al. |
| 4,892,275 | A | 1/1990 | Szegda |
| 4,902,246 | A | 2/1990 | Samchisen |
| 4,906,207 | A | 3/1990 | Banning et al. |
| 4,915,651 | A | 4/1990 | Bout |
| 4,921,447 | A | 5/1990 | Capp et al. |
| 4,923,412 | A | 5/1990 | Morris |
| 4,925,403 | A | 5/1990 | Zorzy |
| 4,927,385 | A | 5/1990 | Cheng |
| 4,929,188 | A | 5/1990 | Lionetto et al. |
| 4,934,960 | A | 6/1990 | Capp et al. |
| 4,938,718 | A | 7/1990 | Guendel |
| 4,941,846 | A | 7/1990 | Guimond et al. |
| 4,952,174 | A | 8/1990 | Sucht et al. |
| 4,957,456 | A | 9/1990 | Olson et al. |
| 4,963,105 | A | 10/1990 | Lewis et al. |
| 4,964,805 | A | 10/1990 | Gabany |
| 4,964,812 | A | 10/1990 | Siemon et al. |
| 4,973,265 | A | 11/1990 | Heeren |
| 4,976,632 | A | 12/1990 | Riches et al. |
| 4,979,911 | A | 12/1990 | Spencer |
| 4,990,104 | A | 2/1991 | Schieferly |
| 4,990,105 | A | 2/1991 | Karlovich |
| 4,990,106 | A | 2/1991 | Szegda |
| 4,992,061 | A | 2/1991 | Brush et al. |
| 5,002,503 | A | 3/1991 | Campbell et al. |
| 5,007,861 | A | 4/1991 | Stirling |
| 5,011,422 | A | 4/1991 | Yeh |
| 5,011,432 | A | 4/1991 | Sucht et al. |
| 5,018,822 | A | 5/1991 | Freismuth et al. |
| 5,021,010 | A | 6/1991 | Wright |
| 5,024,606 | A | 6/1991 | Ming-Hwa |
| 5,030,126 | A | 7/1991 | Hanlon |
| 5,037,328 | A | 8/1991 | Karlovich |
| 5,046,964 | A | 9/1991 | Welsh et al. |
| 5,052,947 | A | 10/1991 | Brodie et al. |
| 5,055,060 | A | 10/1991 | Down et al. |
| 5,059,139 | A | 10/1991 | Spinner |
| 5,059,747 | A | 10/1991 | Bawa et al. |
| 5,062,804 | A | 11/1991 | Jamet et al. |
| 5,066,248 | A | 11/1991 | Gaver et al. |
| 5,067,912 | A | 11/1991 | Bickford et al. |
| 5,073,129 | A | 12/1991 | Szegda |
| 5,074,809 | A | 12/1991 | Rousseau |
| 5,080,600 | A | 1/1992 | Baker et al. |
| 5,083,943 | A | 1/1992 | Tarrant |
| 5,088,937 | A | 2/1992 | Gabany |
| 5,120,260 | A | 6/1992 | Jackson |
| 5,127,853 | A | 7/1992 | McMills et al. |
| 5,131,862 | A | 7/1992 | Gershfeld |
| 5,137,470 | A | 8/1992 | Doles |
| 5,137,471 | A | 8/1992 | Verespej et al. |
| 5,139,440 | A | 8/1992 | Volk et al. |
| 5,141,448 | A | 8/1992 | Mattingly et al. |
| 5,141,451 | A | 8/1992 | Down |
| 5,149,274 | A | 9/1992 | Gallusser et al. |
| 5,150,924 | A | 9/1992 | Yokomatsu et al. |
| 5,154,636 | A | 10/1992 | Vaccaro et al. |
| 5,161,993 | A | 11/1992 | Leibfried, Jr. |
| 5,166,477 | A | 11/1992 | Perin et al. |
| 5,167,545 | A | 12/1992 | O'Brien et al. |
| 5,169,323 | A | 12/1992 | Kawai et al. |
| 5,176,530 | A | 1/1993 | Reylek et al. |
| 5,176,533 | A | 1/1993 | Sakurai et al. |
| 5,181,161 | A | 1/1993 | Hirose et al. |
| 5,183,417 | A | 2/1993 | Bools |
| 5,185,655 | A | 2/1993 | Wakeland |
| 5,186,501 | A | 2/1993 | Mano |
| 5,186,655 | A | 2/1993 | Glenday et al. |
| 5,195,904 | A | 3/1993 | Cyvoct |
| 5,195,905 | A | 3/1993 | Pesci |
| 5,195,906 | A | 3/1993 | Szegda |
| 5,205,547 | A | 4/1993 | Mattingly |
| 5,205,761 | A | 4/1993 | Nilsson |
| D335,487 | S | 5/1993 | Volk et al. |
| 5,207,602 | A | 5/1993 | McMills et al. |
| 5,215,477 | A | 6/1993 | Weber et al. |
| 5,217,391 | A | 6/1993 | Fisher, Jr. |
| 5,217,392 | A | 6/1993 | Hosler, Sr. |
| 5,217,393 | A | 6/1993 | Del et al. |
| 5,221,216 | A | 6/1993 | Gabany et al. |
| 5,227,587 | A | 7/1993 | Paterek |
| 5,247,424 | A | 9/1993 | Harris et al. |
| 5,269,701 | A | 12/1993 | Leibfried, Jr. |
| 5,281,762 | A | 1/1994 | Long et al. |
| 5,283,853 | A | 2/1994 | Szegda |
| 5,284,449 | A | 2/1994 | Vaccaro |
| 5,294,864 | A | 3/1994 | Do |
| 5,295,864 | A | 3/1994 | Birch et al. |
| 5,316,348 | A | 5/1994 | Franklin |
| 5,316,494 | A | 5/1994 | Flanagan et al. |
| 5,318,459 | A | 6/1994 | Shields |
| 5,321,205 | A | 6/1994 | Bawa et al. |
| 5,334,032 | A | 8/1994 | Myers et al. |
| 5,334,051 | A | 8/1994 | Devine et al. |
| 5,338,225 | A | 8/1994 | Jacobsen et al. |
| 5,342,218 | A | 8/1994 | McMills et al. |
| 5,352,134 | A | 10/1994 | Jacobsen et al. |
| 5,354,217 | A | 10/1994 | Gabel et al. |
| 5,362,250 | A | 11/1994 | McMills et al. |
| 5,362,251 | A | 11/1994 | Bielak |
| 5,366,260 | A | 11/1994 | Wartluft |
| 5,371,819 | A | 12/1994 | Szegda |
| 5,371,821 | A | 12/1994 | Szegda |
| 5,371,827 | A | 12/1994 | Szegda |
| 5,380,211 | A | 1/1995 | Kawaguchi et al. |
| 5,389,005 | A | 2/1995 | Kodama |
| 5,393,244 | A | 2/1995 | Szegda |
| 5,397,252 | A | 3/1995 | Wang |
| 5,413,504 | A | 5/1995 | Kloecker et al. |
| 5,431,583 | A | 7/1995 | Szegda |
| 5,435,745 | A | 7/1995 | Booth |
| 5,435,751 | A | 7/1995 | Papenheim et al. |
| 5,435,760 | A | 7/1995 | Miklos |
| 5,439,386 | A | 8/1995 | Ellis et al. |
| 5,444,810 | A | 8/1995 | Szegda |
| 5,455,548 | A | 10/1995 | Grandchamp et al. |
| 5,456,611 | A | 10/1995 | Henry et al. |
| 5,456,614 | A | 10/1995 | Szegda |
| 5,466,173 | A | 11/1995 | Down |
| 5,470,257 | A | 11/1995 | Szegda |
| 5,474,478 | A | 12/1995 | Ballog |
| 5,475,921 | A | 12/1995 | Johnston |
| 5,488,268 | A | 1/1996 | Bauer et al. |
| 5,490,033 | A | 2/1996 | Cronin |
| 5,490,801 | A | 2/1996 | Fisher et al. |
| 5,494,454 | A | 2/1996 | Johnsen |
| 5,499,934 | A | 3/1996 | Jacobsen et al. |
| 5,501,616 | A | 3/1996 | Holliday |
| 5,511,305 | A | 4/1996 | Garner |
| 5,516,303 | A | 5/1996 | Yohn et al. |
| 5,525,076 | A | 6/1996 | Down |
| 5,542,861 | A | 8/1996 | Anhalt et al. |
| 5,548,088 | A | 8/1996 | Gray et al. |
| 5,550,521 | A | 8/1996 | Bernaud et al. |

(56) References Cited

U.S. PATENT DOCUMENTS

| | | | |
|---|---|---|---|
| 5,564,938 | A | 10/1996 | Shenkal et al. |
| 5,571,028 | A | 11/1996 | Szegda |
| 5,586,910 | A | 12/1996 | Del et al. |
| 5,595,499 | A | 1/1997 | Zander et al. |
| 5,598,132 | A | 1/1997 | Stabile |
| 5,607,320 | A | 3/1997 | Wright |
| 5,607,325 | A | 3/1997 | Toma |
| 5,609,501 | A | 3/1997 | McMills et al. |
| 5,620,339 | A | 4/1997 | Gray et al. |
| 5,632,637 | A | 5/1997 | Diener |
| 5,632,651 | A | 5/1997 | Szegda |
| 5,644,104 | A | 7/1997 | Porter et al. |
| 5,649,723 | A | 7/1997 | Larsson |
| 5,651,698 | A | 7/1997 | Locati et al. |
| 5,651,699 | A | 7/1997 | Holliday |
| 5,653,605 | A | 8/1997 | Woehl et al. |
| 5,667,405 | A | 9/1997 | Holliday |
| 5,681,172 | A | 10/1997 | Moldenhauer |
| 5,683,263 | A | 11/1997 | Hsu |
| 5,702,263 | A | 12/1997 | Baumann et al. |
| 5,722,856 | A | 3/1998 | Fuchs et al. |
| 5,735,704 | A | 4/1998 | Anthony |
| 5,743,131 | A | 4/1998 | Holliday et al. |
| 5,746,617 | A | 5/1998 | Porter et al. |
| 5,746,619 | A | 5/1998 | Harting et al. |
| 5,759,618 | A | 6/1998 | Taylor |
| 5,769,652 | A | 6/1998 | Wider |
| 5,769,662 | A | 6/1998 | Stabile et al. |
| 5,774,344 | A | 6/1998 | Casebolt |
| 5,775,927 | A | 7/1998 | Wider |
| 5,788,289 | A | 8/1998 | Cronley |
| 5,791,698 | A | 8/1998 | Wartluft et al. |
| 5,797,633 | A | 8/1998 | Katzer et al. |
| 5,817,978 | A | 10/1998 | Hermant et al. |
| 5,863,220 | A | 1/1999 | Holliday |
| 5,874,603 | A | 2/1999 | Arkles |
| 5,877,452 | A | 3/1999 | McConnell |
| 5,879,191 | A | 3/1999 | Burris |
| 5,882,226 | A | 3/1999 | Bell et al. |
| 5,890,924 | A | 4/1999 | Endo et al. |
| 5,897,795 | A | 4/1999 | Lu et al. |
| 5,906,511 | A | 5/1999 | Bozzer et al. |
| 5,917,153 | A | 6/1999 | Geroldinger |
| 5,921,793 | A | 7/1999 | Phillips |
| 5,938,465 | A | 8/1999 | Fox, Sr. |
| 5,944,548 | A | 8/1999 | Saito |
| 5,951,327 | A | 9/1999 | Marik |
| 5,954,708 | A | 9/1999 | Lopez et al. |
| 5,957,716 | A | 9/1999 | Buckley et al. |
| 5,967,852 | A | 10/1999 | Follingstad et al. |
| 5,975,479 | A | 11/1999 | Suter |
| 5,975,591 | A | 11/1999 | Guest |
| 5,975,949 | A | 11/1999 | Holliday et al. |
| 5,975,951 | A | 11/1999 | Burris et al. |
| 5,977,841 | A | 11/1999 | Lee et al. |
| 5,997,350 | A | 12/1999 | Burris et al. |
| 6,010,349 | A | 1/2000 | Porter, Jr. |
| 6,019,635 | A | 2/2000 | Nelson |
| 6,022,237 | A | 2/2000 | Esh |
| 6,032,358 | A | 3/2000 | Wild |
| 6,036,540 | A | 3/2000 | Beloritsky |
| 6,042,422 | A | 3/2000 | Youtsey |
| 6,048,229 | A | 4/2000 | Lazaro, Jr. |
| 6,053,743 | A | 4/2000 | Mitchell et al. |
| 6,053,769 | A | 4/2000 | Kubota et al. |
| 6,053,777 | A | 4/2000 | Boyle |
| 6,062,607 | A | 5/2000 | Bartholomew |
| 6,080,015 | A | 6/2000 | Andreescu |
| 6,083,030 | A | 7/2000 | Wright |
| 6,083,053 | A | 7/2000 | Anderson et al. |
| 6,089,903 | A | 7/2000 | Stafford et al. |
| 6,089,912 | A | 7/2000 | Tallis et al. |
| 6,089,913 | A | 7/2000 | Holliday |
| 6,093,043 | A | 7/2000 | Gray et al. |
| 6,095,828 | A | 8/2000 | Burland |
| 6,095,841 | A | 8/2000 | Felps |
| 6,123,550 | A | 9/2000 | Burkert et al. |
| 6,123,567 | A | 9/2000 | McCarthy |
| 6,126,487 | A | 10/2000 | Rosenberger |
| 6,132,234 | A | 10/2000 | Waidner et al. |
| 6,142,812 | A | 11/2000 | Hwang |
| 6,146,197 | A | 11/2000 | Holliday et al. |
| 6,152,752 | A | 11/2000 | Fukuda |
| 6,152,753 | A | 11/2000 | Johnson et al. |
| 6,153,830 | A | 11/2000 | Montena |
| 6,162,995 | A | 12/2000 | Bachle et al. |
| 6,164,977 | A | 12/2000 | Lester |
| 6,174,206 | B1 | 1/2001 | Yentile et al. |
| 6,183,298 | B1 | 2/2001 | Henningsen |
| 6,199,913 | B1 | 3/2001 | Wang |
| 6,199,920 | B1 | 3/2001 | Neustadtl |
| 6,210,216 | B1 | 4/2001 | Tso-Chin et al. |
| 6,210,219 | B1 | 4/2001 | Zhu et al. |
| 6,210,222 | B1 | 4/2001 | Langham et al. |
| 6,217,383 | B1 | 4/2001 | Holland et al. |
| 6,238,240 | B1 | 5/2001 | Yu |
| 6,239,359 | B1 | 5/2001 | Lilienthal et al. |
| 6,241,553 | B1 | 6/2001 | Hsia |
| 6,250,942 | B1 | 6/2001 | Lemke et al. |
| 6,250,974 | B1 | 6/2001 | Kerek |
| 6,257,923 | B1 | 7/2001 | Stone et al. |
| 6,261,126 | B1 | 7/2001 | Stirling |
| 6,267,612 | B1 | 7/2001 | Arcykiewicz et al. |
| 6,271,464 | B1 | 8/2001 | Cunningham |
| 6,331,123 | B1 | 12/2001 | Rodrigues |
| 6,332,815 | B1 | 12/2001 | Bruce |
| 6,352,448 | B1 | 3/2002 | Holliday et al. |
| 6,358,077 | B1 | 3/2002 | Young et al. |
| 6,361,348 | B1 | 3/2002 | Hall et al. |
| 6,361,364 | B1 | 3/2002 | Holland et al. |
| 6,375,509 | B2 | 4/2002 | Mountford |
| 6,379,183 | B1 | 4/2002 | Ayres et al. |
| 6,394,840 | B1 | 5/2002 | Gassauer et al. |
| 6,396,367 | B1 | 5/2002 | Rosenberger |
| D458,904 | S | 6/2002 | Montena |
| 6,398,571 | B1 | 6/2002 | Nishide et al. |
| 6,406,330 | B2 | 6/2002 | Bruce |
| 6,409,534 | B1 | 6/2002 | Weisz-Margulescu |
| D460,739 | S | 7/2002 | Fox |
| D460,740 | S | 7/2002 | Montena |
| D460,946 | S | 7/2002 | Montena |
| D460,947 | S | 7/2002 | Montena |
| D460,948 | S | 7/2002 | Montena |
| 6,422,884 | B1 | 7/2002 | Babasick et al. |
| 6,422,900 | B1 | 7/2002 | Hogan |
| 6,425,782 | B1 | 7/2002 | Holland |
| D461,166 | S | 8/2002 | Montena |
| D461,167 | S | 8/2002 | Montena |
| D461,778 | S | 8/2002 | Fox |
| D462,058 | S | 8/2002 | Montena |
| D462,060 | S | 8/2002 | Fox |
| 6,439,899 | B1 | 8/2002 | Muzslay et al. |
| D462,327 | S | 9/2002 | Montena |
| 6,443,763 | B1 | 9/2002 | Richet |
| 6,450,829 | B1 | 9/2002 | Weisz-Margulescu |
| 6,454,463 | B1 | 9/2002 | Halbach et al. |
| 6,464,526 | B1 | 10/2002 | Seufert et al. |
| 6,464,527 | B2 | 10/2002 | Volpe et al. |
| 6,467,816 | B1 | 10/2002 | Huang |
| 6,468,100 | B1 | 10/2002 | Meyer et al. |
| 6,491,546 | B1 | 12/2002 | Perry |
| D468,696 | S | 1/2003 | Montena |
| 6,506,083 | B1 | 1/2003 | Bickford et al. |
| 6,510,610 | B2 | 1/2003 | Losinger |
| 6,520,800 | B1 | 2/2003 | Michelbach et al. |
| 6,530,807 | B2 | 3/2003 | Rodrigues et al. |
| 6,540,531 | B2 | 4/2003 | Syed et al. |
| 6,558,194 | B2 | 5/2003 | Montena |
| 6,572,419 | B2 | 6/2003 | Feye-Homann |
| 6,576,833 | B2 | 6/2003 | Covaro et al. |
| 6,619,876 | B2 | 9/2003 | Vaitkus et al. |
| 6,634,906 | B1 | 10/2003 | Yeh |
| 6,637,101 | B2 | 10/2003 | Hathaway et al. |
| 6,645,011 | B2 | 11/2003 | Schneider et al. |

(56) References Cited

U.S. PATENT DOCUMENTS 6,663,397 B1 12/2003 Lin et al.
6,676,446 B2 1/2004 Montena
6,683,253 B1 1/2004 Lee
6,683,773 B2 1/2004 Montena
6,692,285 B2 2/2004 Islam
6,692,286 B1 2/2004 De Cet
6,695,636 B2 2/2004 Hall et al.
6,705,875 B2 3/2004 Berghorn et al.
6,705,884 B1 3/2004 McCarthy
6,709,280 B1 3/2004 Gretz
6,709,289 B2 3/2004 Huber et al.
6,712,631 B1 3/2004 Youtsey
6,716,041 B2 4/2004 Ferderer et al.
6,716,062 B1 4/2004 Palinkas et al.
6,733,336 B1 5/2004 Montena et al.
6,733,337 B2 5/2004 Kodaira
6,743,040 B1 6/2004 Nakamura
6,749,454 B2 6/2004 Schmidt et al.
6,751,081 B1 6/2004 Kooiman
6,752,633 B2 6/2004 Aizawa et al.
6,761,571 B2 7/2004 Hida
6,767,248 B1 7/2004 Hung
6,769,926 B1 8/2004 Montena
6,780,029 B1 8/2004 Gretz
6,780,042 B1 8/2004 Badescu et al.
6,780,052 B2 8/2004 Montena et al.
6,780,068 B2 8/2004 Bartholoma et al.
6,783,394 B1 8/2004 Holliday
6,786,767 B1 9/2004 Fuks et al.
6,790,081 B2 9/2004 Burris et al.
6,793,528 B2 9/2004 Lin et al.
6,796,847 B2 9/2004 Abughazaleh et al.
6,802,738 B1 10/2004 Henningsen
6,805,581 B2 10/2004 Love
6,805,583 B2 10/2004 Holliday et al.
6,805,584 B1 10/2004 Chen
6,808,415 B1 10/2004 Montena
6,817,272 B2 11/2004 Holland
6,817,896 B2 11/2004 Derenthal
6,817,897 B2 11/2004 Chee
6,827,608 B2 12/2004 Hall et al.
6,830,479 B2 12/2004 Holliday
6,848,115 B2 1/2005 Sugiura et al.
6,848,939 B2 2/2005 Stirling
6,848,940 B2 2/2005 Montena
6,848,941 B2 2/2005 Wlos et al.
6,884,113 B1 4/2005 Montena
6,884,115 B2 4/2005 Malloy
6,887,102 B1 5/2005 Burris et al.
6,916,200 B2 7/2005 Burris et al.
6,929,265 B2 8/2005 Holland et al.
6,929,508 B1 8/2005 Holland
6,935,866 B2 8/2005 Kerekes et al.
6,939,169 B2 9/2005 Islam et al.
6,942,516 B2 9/2005 Shimoyama et al.
6,942,520 B2 9/2005 Barlian et al.
6,945,805 B1 9/2005 Bollinger
6,948,976 B2 9/2005 Goodwin et al.
6,953,371 B2 10/2005 Baker et al.
6,955,563 B1 10/2005 Croan
D511,497 S 11/2005 Murphy et al.
D512,024 S 11/2005 Murphy et al.
D512,689 S 12/2005 Murphy et al.
6,971,912 B2 12/2005 Montena et al.
7,008,263 B2 3/2006 Holland
7,018,216 B1 3/2006 Clark et al.
7,018,235 B1 3/2006 Burris et al.
7,029,326 B2 4/2006 Montena
D521,454 S 5/2006 Murphy et al.
7,063,565 B2 6/2006 Ward
7,070,447 B1 7/2006 Montena
7,077,697 B2 7/2006 Kooiman
7,077,699 B2 7/2006 Islam et al.
7,086,897 B2 8/2006 Montena
7,090,525 B1 8/2006 Morana
7,094,114 B2 8/2006 Kurimoto
7,097,499 B1 8/2006 Purdy
7,102,868 B2 9/2006 Montena
7,108,547 B2 9/2006 Kisling et al.
7,108,548 B2 9/2006 Burris et al.
7,112,078 B2 9/2006 Czikora
7,112,093 B1 9/2006 Holland
7,114,990 B2 10/2006 Bence et al.
7,117,990 B2 10/2006 Sarif
7,118,285 B2 10/2006 Fenwick et al.
7,118,382 B2 10/2006 Kerekes et al.
7,118,416 B2 10/2006 Montena et al.
7,125,283 B1 10/2006 Lin
7,128,603 B2 10/2006 Burris et al.
7,128,604 B2 10/2006 Hall
7,131,867 B1 11/2006 Foster et al.
7,131,868 B2 11/2006 Montena
7,140,645 B2 11/2006 Cronley
7,144,271 B1 12/2006 Burris et al.
7,144,272 B1 12/2006 Burris et al.
7,147,509 B1 12/2006 Burris et al.
7,153,159 B2 12/2006 Burris et al.
7,156,696 B1 1/2007 Montena
7,161,785 B2 1/2007 Chawgo
7,165,974 B2 1/2007 Kooiman
7,173,121 B2 2/2007 Fang
7,179,121 B1 2/2007 Burris et al.
7,179,122 B2 2/2007 Holliday
7,182,639 B2 2/2007 Burris
7,183,639 B2 2/2007 Mihara et al.
7,189,097 B2 3/2007 Benham
7,189,114 B1 3/2007 Burris et al.
7,192,308 B2 3/2007 Rodrigues et al.
7,229,303 B2 6/2007 Vermoesen et al.
7,238,047 B2 7/2007 Saettele et al.
7,252,536 B2 8/2007 Lazaro et al.
7,252,546 B1 8/2007 Holland
7,255,598 B2 8/2007 Montena et al.
7,261,594 B2 8/2007 Kodama et al.
7,264,502 B2 9/2007 Holland
7,278,882 B1 10/2007 Li
7,288,002 B2 10/2007 Rodrigues et al.
7,291,033 B2 11/2007 Hu
7,297,023 B2 11/2007 Chawgo
7,299,550 B2 11/2007 Montena
7,303,435 B2 12/2007 Burris et al.
7,311,555 B1 12/2007 Burris et al.
7,318,609 B2 1/2008 Naito et al.
7,322,846 B2 1/2008 Camelio
7,322,851 B2 1/2008 Brookmire
7,329,139 B2 2/2008 Benham
7,331,820 B2 2/2008 Burris et al.
7,335,058 B1 2/2008 Burris et al.
7,347,129 B1 3/2008 Youtsey
7,347,726 B2 3/2008 Wlos
7,347,727 B2 3/2008 Wlos et al.
7,347,729 B2 3/2008 Thomas et al.
7,351,088 B1 4/2008 Qu
7,357,641 B2 4/2008 Kerekes et al.
7,364,462 B2 4/2008 Holland
7,371,112 B2 5/2008 Burris et al.
7,371,113 B2 5/2008 Burris et al.
7,375,533 B2 5/2008 Gale
7,387,524 B2 6/2008 Cheng
7,393,245 B2 7/2008 Palinkas et al.
7,396,249 B2 7/2008 Kauffman
7,404,737 B1 7/2008 Youtsey
7,410,389 B2 8/2008 Holliday
7,416,415 B2 8/2008 Hart et al.
7,438,327 B2 10/2008 Auray et al.
7,452,239 B2 11/2008 Montena
7,455,550 B1 11/2008 Sykes
7,458,850 B1 12/2008 Burris et al.
7,458,851 B2 12/2008 Montena
7,462,068 B2 12/2008 Amidon
7,467,980 B2 12/2008 Chiu
7,476,127 B1 1/2009 Wei
7,478,475 B2 1/2009 Hall
7,479,033 B1 1/2009 Sykes et al.

(56) References Cited

U.S. PATENT DOCUMENTS

| | | | |
|---|---|---|---|
| 7,479,035 | B2 | 1/2009 | Bence et al. |
| 7,481,673 | B1 | 1/2009 | Qu et al. |
| 7,484,988 | B2 | 2/2009 | Ma et al. |
| 7,484,997 | B2 | 2/2009 | Hofling |
| 7,488,210 | B1 | 2/2009 | Burris et al. |
| 7,494,355 | B2 | 2/2009 | Hughes et al. |
| 7,497,729 | B1 | 3/2009 | Wei |
| 7,500,868 | B2 | 3/2009 | Holland et al. |
| 7,500,873 | B1 | 3/2009 | Hart |
| 7,507,116 | B2 | 3/2009 | Laerke et al. |
| 7,507,117 | B2 | 3/2009 | Amidon |
| 7,513,788 | B2 | 4/2009 | Camelio |
| 7,537,482 | B2 | 5/2009 | Burris et al. |
| 7,540,759 | B2 | 6/2009 | Liu et al. |
| 7,544,094 | B1 | 6/2009 | Paglia et al. |
| 7,563,133 | B2 | 7/2009 | Stein |
| 7,566,236 | B2 | 7/2009 | Malloy et al. |
| 7,568,945 | B2 | 8/2009 | Chee et al. |
| 7,578,693 | B2 | 8/2009 | Yoshida et al. |
| 7,588,454 | B2 | 9/2009 | Nakata et al. |
| 7,607,942 | B1 | 10/2009 | Van Swearingen |
| 7,625,227 | B1 | 12/2009 | Henderson et al. |
| 7,632,143 | B1 | 12/2009 | Islam |
| 7,635,283 | B1 | 12/2009 | Islam |
| 7,648,383 | B2 | 1/2010 | Matthias et al. |
| 7,651,376 | B2 | 1/2010 | Schreier |
| 7,674,132 | B1 | 3/2010 | Chen |
| 7,682,177 | B2 | 3/2010 | Berthet |
| 7,694,420 | B2 | 4/2010 | Ehret et al. |
| 7,714,229 | B2 | 5/2010 | Burris et al. |
| 7,726,996 | B2 | 6/2010 | Burris et al. |
| 7,727,011 | B2 | 6/2010 | Montena et al. |
| 7,749,021 | B2 | 7/2010 | Brodeur |
| 7,753,705 | B2 | 7/2010 | Montena |
| 7,753,710 | B2 | 7/2010 | George |
| 7,753,727 | B1 | 7/2010 | Islam et al. |
| 7,758,356 | B2 | 7/2010 | Burris et al. |
| 7,758,370 | B1 | 7/2010 | Flaherty |
| 7,794,275 | B2 | 9/2010 | Rodrigues |
| 7,806,714 | B2 | 10/2010 | Williams et al. |
| 7,806,725 | B1 | 10/2010 | Chen |
| 7,811,133 | B2 | 10/2010 | Gray |
| 7,814,654 | B2 | 10/2010 | Pichler |
| D626,920 | S | 11/2010 | Purdy et al. |
| 7,824,216 | B2 | 11/2010 | Purdy |
| 7,828,594 | B2 | 11/2010 | Burris et al. |
| 7,828,595 | B2 | 11/2010 | Mathews |
| 7,830,154 | B2 | 11/2010 | Gale |
| 7,833,053 | B2 | 11/2010 | Mathews |
| 7,845,976 | B2 | 12/2010 | Mathews |
| 7,845,978 | B1 | 12/2010 | Chen |
| 7,845,980 | B1 | 12/2010 | Amidon |
| 7,850,472 | B2 | 12/2010 | Friedrich et al. |
| 7,850,487 | B1 | 12/2010 | Wei |
| 7,857,661 | B1 | 12/2010 | Islam |
| 7,874,870 | B1 | 1/2011 | Chen |
| 7,887,354 | B2 | 2/2011 | Holliday |
| 7,892,004 | B2 | 2/2011 | Hertzler et al. |
| 7,892,005 | B2 | 2/2011 | Haube |
| 7,892,024 | B1 | 2/2011 | Chen |
| 7,914,326 | B2 | 3/2011 | Sutter |
| 7,918,687 | B2 | 4/2011 | Paynter et al. |
| 7,927,135 | B1 | 4/2011 | Wlos |
| 7,934,955 | B1 | 5/2011 | Hsia |
| 7,938,662 | B2 | 5/2011 | Burris et al. |
| 7,942,695 | B1 | 5/2011 | Lu |
| 7,950,958 | B2 | 5/2011 | Mathews |
| 7,950,961 | B2 | 5/2011 | Chabalowski et al. |
| 7,955,126 | B2 | 6/2011 | Bence et al. |
| 7,972,158 | B2 | 7/2011 | Wild et al. |
| 7,972,176 | B2 | 7/2011 | Burris et al. |
| 7,982,005 | B2 | 7/2011 | Ames et al. |
| 8,011,955 | B1 | 9/2011 | Lu |
| 8,025,518 | B2 | 9/2011 | Burris et al. |
| 8,029,315 | B2 | 10/2011 | Purdy et al. |
| 8,029,316 | B2 | 10/2011 | Snyder et al. |
| 8,037,599 | B2 | 10/2011 | Pichler |
| 8,047,872 | B2 | 11/2011 | Burris et al. |
| 8,062,044 | B2 | 11/2011 | Montena et al. |
| 8,062,063 | B2 | 11/2011 | Malloy et al. |
| 8,070,504 | B2 | 12/2011 | Amidon et al. |
| 8,075,337 | B2 | 12/2011 | Malloy et al. |
| 8,075,338 | B1 | 12/2011 | Montena |
| 8,079,860 | B1 | 12/2011 | Zraik |
| 8,087,954 | B2 | 1/2012 | Fuchs |
| 8,113,875 | B2 | 2/2012 | Malloy et al. |
| 8,113,879 | B1 | 2/2012 | Zraik |
| 8,157,587 | B2 | 4/2012 | Paynter et al. |
| 8,157,588 | B1 | 4/2012 | Rodrigues et al. |
| 8,167,635 | B1 | 5/2012 | Mathews |
| 8,167,636 | B1 | 5/2012 | Montena |
| 8,172,612 | B2 | 5/2012 | Bence et al. |
| 8,177,572 | B2 | 5/2012 | Feye-Hohmann |
| 8,192,237 | B2 | 6/2012 | Purdy et al. |
| 8,206,172 | B2 | 6/2012 | Katagiri et al. |
| D662,893 | S | 7/2012 | Haberek et al. |
| 8,231,412 | B2 | 7/2012 | Paglia et al. |
| 8,262,408 | B1 | 9/2012 | Kelly |
| 8,272,893 | B2 | 9/2012 | Burris et al. |
| 8,287,310 | B2 | 10/2012 | Burris et al. |
| 8,287,320 | B2 | 10/2012 | Purdy et al. |
| 8,313,345 | B2 | 11/2012 | Purdy |
| 8,313,353 | B2 | 11/2012 | Purdy et al. |
| 8,317,539 | B2 | 11/2012 | Stein |
| 8,319,136 | B2 | 11/2012 | Byron et al. |
| 8,323,053 | B2 | 12/2012 | Montena |
| 8,323,058 | B2 | 12/2012 | Flaherty et al. |
| 8,323,060 | B2 | 12/2012 | Purdy et al. |
| 8,337,229 | B2 | 12/2012 | Montena |
| 8,366,481 | B2 | 2/2013 | Ehret et al. |
| 8,366,482 | B2 | 2/2013 | Burris et al. |
| 8,376,769 | B2 | 2/2013 | Holland et al. |
| D678,844 | S | 3/2013 | Haberek |
| 8,398,421 | B2 | 3/2013 | Haberek et al. |
| 8,430,688 | B2 | 4/2013 | Montena et al. |
| 8,449,326 | B2 | 5/2013 | Holland et al. |
| 8,465,322 | B2 | 6/2013 | Purdy |
| 8,469,739 | B2 | 6/2013 | Rodrigues et al. |
| 8,469,740 | B2 | 6/2013 | Ehret et al. |
| D686,164 | S | 7/2013 | Haberek et al. |
| D686,576 | S | 7/2013 | Haberek et al. |
| 8,475,205 | B2 | 7/2013 | Ehret et al. |
| 8,480,430 | B2 | 7/2013 | Ehret et al. |
| 8,480,431 | B2 | 7/2013 | Ehret et al. |
| 8,485,845 | B2 | 7/2013 | Ehret et al. |
| 8,506,325 | B2 | 8/2013 | Malloy et al. |
| 8,506,326 | B2 | 8/2013 | Purdy |
| 8,517,763 | B2 | 8/2013 | Burris et al. |
| 8,517,764 | B2 | 8/2013 | Wei et al. |
| 8,529,279 | B2 | 9/2013 | Montena |
| 8,550,835 | B2 | 10/2013 | Montena |
| 8,568,163 | B2 | 10/2013 | Burris et al. |
| 8,568,165 | B2 | 10/2013 | Wei et al. |
| 8,591,244 | B2 | 11/2013 | Thomas et al. |
| 8,597,050 | B2 | 12/2013 | Flaherty et al. |
| 8,622,776 | B2 | 1/2014 | Morikawa et al. |
| 8,636,529 | B2 | 1/2014 | Stein |
| 8,636,541 | B2 | 1/2014 | Chastain et al. |
| 8,647,136 | B2 | 2/2014 | Purdy et al. |
| 8,690,603 | B2 | 4/2014 | Bence et al. |
| 8,721,365 | B2 | 5/2014 | Holland |
| 8,727,800 | B2 | 5/2014 | Holland et al. |
| 8,777,658 | B2 | 7/2014 | Holland et al. |
| 8,777,661 | B2 | 7/2014 | Holland et al. |
| 8,827,743 | B1 | 9/2014 | Maury |
| 8,858,251 | B2 | 10/2014 | Montena |
| 8,888,526 | B2 | 11/2014 | Burris |
| 8,920,192 | B2 | 12/2014 | Montena |
| 9,017,101 | B2 | 4/2015 | Ehret et al. |
| 9,048,599 | B2 | 6/2015 | Burris |
| 9,130,281 | B2 | 9/2015 | Phillips, Jr. et al. |
| 9,153,911 | B2 | 10/2015 | Burris et al. |
| 9,166,348 | B2 | 10/2015 | Burris et al. |
| 9,172,154 | B2 | 10/2015 | Burris |

(56) References Cited

U.S. PATENT DOCUMENTS

| | | | |
|---|---|---|---|
| 9,172,157 | B2 | 10/2015 | Burris |
| 9,203,167 | B2 | 12/2015 | Holliday et al. |
| 9,257,780 | B2 | 2/2016 | Thomas et al. |
| 9,515,432 | B2 | 12/2016 | Purdy et al. |
| 9,548,472 | B2 | 1/2017 | Yang et al. |
| 9,711,917 | B2 | 7/2017 | Montena et al. |
| 10,211,547 | B2 | 2/2019 | Burris et al. |
| 10,644,417 | B2 * | 5/2020 | Balcer ................. H01R 13/502 |
| 2001/0034143 | A1 | 10/2001 | Annequin |
| 2001/0046802 | A1 | 11/2001 | Perry et al. |
| 2001/0051448 | A1 | 12/2001 | Gonzales |
| 2002/0013088 | A1 | 1/2002 | Rodrigues et al. |
| 2002/0019161 | A1 | 2/2002 | Finke et al. |
| 2002/0038720 | A1 | 4/2002 | Kai et al. |
| 2002/0146935 | A1 | 10/2002 | Wong |
| 2003/0110977 | A1 | 6/2003 | Batlaw |
| 2003/0119358 | A1 | 6/2003 | Henningsen |
| 2003/0139081 | A1 | 7/2003 | Hall et al. |
| 2003/0194890 | A1 | 10/2003 | Ferderer et al. |
| 2003/0214370 | A1 | 11/2003 | Allison et al. |
| 2003/0224657 | A1 | 12/2003 | Malloy |
| 2004/0031144 | A1 | 2/2004 | Holland |
| 2004/0077215 | A1 | 4/2004 | Palinkas et al. |
| 2004/0102089 | A1 | 5/2004 | Chee |
| 2004/0137778 | A1 | 7/2004 | Mattheeuws et al. |
| 2004/0157499 | A1 | 8/2004 | Nania et al. |
| 2004/0194585 | A1 | 10/2004 | Clark |
| 2004/0209516 | A1 | 10/2004 | Burris et al. |
| 2004/0219833 | A1 | 11/2004 | Burris et al. |
| 2004/0229504 | A1 | 11/2004 | Liu |
| 2005/0042919 | A1 | 2/2005 | Montena |
| 2005/0079762 | A1 | 4/2005 | Hsia |
| 2005/0159045 | A1 | 7/2005 | Huang |
| 2005/0170692 | A1 | 8/2005 | Montena |
| 2005/0181652 | A1 | 8/2005 | Montena et al. |
| 2005/0181668 | A1 | 8/2005 | Montena et al. |
| 2005/0208827 | A1 | 9/2005 | Burris et al. |
| 2005/0219833 | A1 | 10/2005 | Wu et al. |
| 2005/0233636 | A1 | 10/2005 | Rodrigues et al. |
| 2006/0014425 | A1 | 1/2006 | Montena |
| 2006/0099853 | A1 | 5/2006 | Sattele et al. |
| 2006/0110977 | A1 | 5/2006 | Matthews |
| 2006/0113107 | A1 | 6/2006 | Williams |
| 2006/0154519 | A1 | 7/2006 | Montena |
| 2006/0166552 | A1 | 7/2006 | Bence et al. |
| 2006/0178046 | A1 | 8/2006 | Tusini |
| 2006/0194465 | A1 | 8/2006 | Czikora |
| 2006/0199040 | A1 | 9/2006 | Yamada et al. |
| 2006/0223355 | A1 | 10/2006 | Hirschmann |
| 2006/0246774 | A1 | 11/2006 | Buck |
| 2006/0258209 | A1 | 11/2006 | Hall |
| 2006/0276079 | A1 | 12/2006 | Chen |
| 2007/0004276 | A1 | 1/2007 | Stein |
| 2007/0026734 | A1 | 2/2007 | Bence et al. |
| 2007/0049113 | A1 | 3/2007 | Rodrigues et al. |
| 2007/0054535 | A1 | 3/2007 | Hall et al. |
| 2007/0059968 | A1 | 3/2007 | Ohtaka et al. |
| 2007/0082533 | A1 | 4/2007 | Currier et al. |
| 2007/0087613 | A1 | 4/2007 | Schumacher et al. |
| 2007/0123101 | A1 | 5/2007 | Palinkas |
| 2007/0155232 | A1 | 7/2007 | Burris et al. |
| 2007/0173100 | A1 | 7/2007 | Benham |
| 2007/0175027 | A1 | 8/2007 | Khemakhem et al. |
| 2007/0232117 | A1 | 10/2007 | Singer |
| 2007/0243759 | A1 | 10/2007 | Rodrigues et al. |
| 2007/0243762 | A1 | 10/2007 | Burke et al. |
| 2007/0287328 | A1 | 12/2007 | Hart et al. |
| 2008/0032556 | A1 | 2/2008 | Schreier |
| 2008/0102696 | A1 | 5/2008 | Montena |
| 2008/0171466 | A1 | 7/2008 | Buck et al. |
| 2008/0200066 | A1 | 8/2008 | Hofling |
| 2008/0200068 | A1 | 8/2008 | Aguirre |
| 2008/0214040 | A1 | 9/2008 | Holterhoff et al. |
| 2008/0289470 | A1 | 11/2008 | Aston |
| 2008/0310026 | A1 | 12/2008 | Nakayama et al. |
| 2009/0029590 | A1 | 1/2009 | Sykes et al. |
| 2009/0098770 | A1 | 4/2009 | Bence et al. |
| 2009/0104801 | A1 | 4/2009 | Silva |
| 2009/0163075 | A1 | 6/2009 | Blew et al. |
| 2009/0186505 | A1 | 7/2009 | Mathews |
| 2009/0264003 | A1 | 10/2009 | Hertzler et al. |
| 2009/0305560 | A1 | 12/2009 | Chen |
| 2010/0007441 | A1 | 1/2010 | Yagisawa et al. |
| 2010/0022125 | A1 | 1/2010 | Burris et al. |
| 2010/0028563 | A1 | 2/2010 | Ota |
| 2010/0055978 | A1 | 3/2010 | Montena |
| 2010/0080563 | A1 | 4/2010 | Difonzo et al. |
| 2010/0081321 | A1 | 4/2010 | Malloy et al. |
| 2010/0081322 | A1 | 4/2010 | Malloy et al. |
| 2010/0087071 | A1 | 4/2010 | Difonzo et al. |
| 2010/0105246 | A1 | 4/2010 | Burris et al. |
| 2010/0124839 | A1 | 5/2010 | Montena |
| 2010/0130060 | A1 | 5/2010 | Islam |
| 2010/0178799 | A1 | 7/2010 | Lee et al. |
| 2010/0216339 | A1 | 8/2010 | Burris et al. |
| 2010/0233901 | A1 | 9/2010 | Wild et al. |
| 2010/0233902 | A1 | 9/2010 | Youtsey |
| 2010/0233903 | A1 | 9/2010 | Islam |
| 2010/0255719 | A1 | 10/2010 | Purdy |
| 2010/0255721 | A1 | 10/2010 | Purdy et al. |
| 2010/0279548 | A1 | 11/2010 | Montena et al. |
| 2010/0297871 | A1 | 11/2010 | Haube |
| 2010/0297875 | A1 | 11/2010 | Purdy et al. |
| 2010/0304579 | A1 | 12/2010 | Kisling |
| 2010/0323541 | A1 | 12/2010 | Amidon et al. |
| 2011/0021072 | A1 | 1/2011 | Purdy |
| 2011/0021075 | A1 | 1/2011 | Orner et al. |
| 2011/0027039 | A1 | 2/2011 | Blair |
| 2011/0039448 | A1 | 2/2011 | Stein |
| 2011/0053413 | A1 | 3/2011 | Mathews |
| 2011/0074388 | A1 | 3/2011 | Bowman |
| 2011/0080158 | A1 | 4/2011 | Lawrence et al. |
| 2011/0111623 | A1 | 5/2011 | Burris et al. |
| 2011/0111626 | A1 | 5/2011 | Paglia et al. |
| 2011/0117774 | A1 | 5/2011 | Malloy et al. |
| 2011/0143567 | A1 | 6/2011 | Purdy et al. |
| 2011/0151714 | A1 | 6/2011 | Flaherty et al. |
| 2011/0230089 | A1 | 9/2011 | Amidon et al. |
| 2011/0230091 | A1 | 9/2011 | Krenceski et al. |
| 2011/0237123 | A1 | 9/2011 | Burris et al. |
| 2011/0237124 | A1 | 9/2011 | Flaherty et al. |
| 2011/0250789 | A1 | 10/2011 | Burris et al. |
| 2011/0318958 | A1 | 12/2011 | Burris et al. |
| 2012/0021642 | A1 | 1/2012 | Zraik |
| 2012/0040537 | A1 | 2/2012 | Burris |
| 2012/0045933 | A1 | 2/2012 | Youtsey |
| 2012/0064768 | A1 | 3/2012 | Islam et al. |
| 2012/0088404 | A1 | 4/2012 | Wild et al. |
| 2012/0094530 | A1 | 4/2012 | Montena |
| 2012/0100751 | A1 | 4/2012 | Montena |
| 2012/0108098 | A1 | 5/2012 | Burris et al. |
| 2012/0122329 | A1 | 5/2012 | Montena |
| 2012/0129387 | A1 | 5/2012 | Holland et al. |
| 2012/0171894 | A1 | 7/2012 | Malloy et al. |
| 2012/0178289 | A1 | 7/2012 | Holliday |
| 2012/0202378 | A1 | 8/2012 | Krenceski et al. |
| 2012/0222302 | A1 | 9/2012 | Purdy et al. |
| 2012/0225581 | A1 | 9/2012 | Amidon et al. |
| 2012/0270439 | A1 * | 10/2012 | Tremba ................ H01R 9/0524 439/578 |
| 2012/0315788 | A1 | 12/2012 | Montena |
| 2012/0325513 | A1 | 12/2012 | Bungo et al. |
| 2013/0065433 | A1 | 3/2013 | Burris |
| 2013/0072057 | A1 | 3/2013 | Burris |
| 2013/0178096 | A1 | 7/2013 | Matzen |
| 2013/0273761 | A1 | 10/2013 | Ehret et al. |
| 2014/0106612 | A1 | 4/2014 | Burris |
| 2014/0106613 | A1 | 4/2014 | Burris et al. |
| 2014/0120766 | A1 | 5/2014 | Meister et al. |
| 2014/0137393 | A1 | 5/2014 | Chastain et al. |
| 2014/0148044 | A1 | 5/2014 | Balcer et al. |
| 2014/0148051 | A1 | 5/2014 | Bence et al. |
| 2014/0154907 | A1 | 6/2014 | Ehret et al. |
| 2014/0205240 | A1 | 7/2014 | Scadden et al. |

(56) References Cited

U.S. PATENT DOCUMENTS

| | | | |
|---|---|---|---|
| 2014/0298650 | A1 | 10/2014 | Chastain et al. |
| 2014/0322968 | A1 | 10/2014 | Burris |
| 2014/0342605 | A1 | 11/2014 | Burris et al. |
| 2015/0118901 | A1 | 4/2015 | Burris |
| 2015/0295331 | A1 | 10/2015 | Burris |

FOREIGN PATENT DOCUMENTS

| | | | |
|---|---|---|---|
| CN | 201149937 | Y | 11/2008 |
| CN | 201178228 | Y | 1/2009 |
| CN | 201904508 | U | 7/2011 |
| DE | 0047931 | C | 8/1889 |
| DE | 0102289 | C | 4/1899 |
| DE | 1117687 | B | 11/1961 |
| DE | 1191880 | B | 4/1965 |
| DE | 1515398 | B1 | 4/1970 |
| DE | 2225764 | A1 | 12/1972 |
| DE | 2221936 | A1 | 11/1973 |
| DE | 2261973 | A1 | 6/1974 |
| DE | 3117320 | A1 | 4/1982 |
| DE | 3211008 | A1 | 10/1983 |
| DE | 9001608 | U1 | 4/1990 |
| DE | 4439852 | A1 | 5/1996 |
| DE | 19749130 | C1 | 8/1999 |
| DE | 19957518 | A1 | 9/2001 |
| DE | 10346914 | A1 | 5/2004 |
| EP | 0072104 | A1 | 2/1983 |
| EP | 0115179 | A2 | 8/1984 |
| EP | 0116157 | A1 | 8/1984 |
| EP | 0167738 | A2 | 1/1986 |
| EP | 0223464 | A2 | 5/1987 |
| EP | 0265276 | A2 | 4/1988 |
| EP | 0350835 | A2 | 1/1990 |
| EP | 0428424 | A2 | 5/1991 |
| EP | 0867978 | A2 | 9/1998 |
| EP | 1069654 | A1 | 1/2001 |
| EP | 1094565 | A1 | 4/2001 |
| EP | 1115179 | A2 | 7/2001 |
| EP | 1191268 | A1 | 3/2002 |
| EP | 1455420 | A1 | 9/2004 |
| EP | 1501159 | A1 | 1/2005 |
| EP | 1548898 | A1 | 6/2005 |
| EP | 1603200 | A1 | 12/2005 |
| EP | 1701410 | A2 | 9/2006 |
| EP | 2051340 | A1 | 4/2009 |
| EP | 3422480 | A1 | 1/2019 |
| FR | 2204331 | A5 | 5/1974 |
| FR | 2232846 | A1 | 1/1975 |
| FR | 2234680 | A2 | 1/1975 |
| FR | 2312918 | A1 | 12/1976 |
| FR | 2462798 | A1 | 2/1981 |
| FR | 2494508 | A1 | 5/1982 |
| GB | 0589697 | A | 6/1947 |
| GB | 1087228 | A | 10/1967 |
| GB | 1270846 | A | 4/1972 |
| GB | 1332888 | A | 10/1973 |
| GB | 1401373 | A | 7/1975 |
| GB | 1421215 | A | 1/1976 |
| GB | 2019665 | A | 10/1979 |
| GB | 2079549 | A | 1/1982 |
| GB | 2252677 | A | 8/1992 |
| GB | 2264201 | A | 8/1993 |
| GB | 2331634 | A | 5/1999 |
| GB | 2448595 | A | 10/2008 |
| GB | 2450248 | A | 12/2008 |
| GB | 2477479 | A | 8/2011 |
| IN | 201300822 | | 10/2013 |
| JP | 03-280369 | A | 12/1991 |
| JP | 2001-102299 | A | 4/2001 |
| JP | 2002-015823 | A | 1/2002 |
| JP | 3280369 | B2 | 5/2002 |
| JP | 2003-082189 | A | 3/2003 |
| JP | 4129978 | B2 | 8/2008 |
| JP | 2009-277571 | A | 11/2009 |
| JP | 4391268 | B2 | 12/2009 |
| JP | 4503793 | B2 | 7/2010 |
| KR | 10-0622526 | B1 | 9/2006 |
| TW | 427044 | B | 3/2001 |
| WO | 87/00351 | A1 | 1/1987 |
| WO | 00/05785 | A1 | 2/2000 |
| WO | 01/86756 | A1 | 11/2001 |
| WO | 02/69457 | A1 | 9/2002 |
| WO | 2004/013883 | A2 | 2/2004 |
| WO | 2004/098795 | A1 | 11/2004 |
| WO | 2006/081141 | A1 | 8/2006 |
| WO | 2007/062845 | A1 | 6/2007 |
| WO | 2009/066705 | A1 | 5/2009 |
| WO | 2010/135181 | A2 | 11/2010 |
| WO | 2011/057033 | A1 | 5/2011 |
| WO | 2011/128665 | A1 | 10/2011 |
| WO | 2011/128666 | A1 | 10/2011 |
| WO | 2012/162431 | A2 | 11/2012 |
| WO | 2013/126629 | A2 | 8/2013 |
| WO | 2018/206127 | A1 | 11/2018 |
| WO | 2019/134828 | A1 | 7/2019 |

* cited by examiner

COAXIAL CABLE CONNECTOR ASSEMBLIES WITH OUTER CONDUCTOR ENGAGEMENT FEATURES AND METHODS FOR USING THE SAME

CROSS-REFERENCE TO RELATED APPLICATION

This application claims the benefit of priority under 35 U.S.C. § 119 of U.S. Provisional Application Ser. No. 63/169,159, filed Mar. 31, 2021, the content of which is relied upon and incorporated herein by reference in its entirety.

BACKGROUND

The present disclosure relates to coaxial cable connector assemblies, and more particularly to coaxial cable connector assemblies including outer conductor engagement features.

Coaxial cable connector assemblies, such as F-type connectors, are conventionally used to connect a coaxial cable to a device, such as a television or the like. Coaxial cables generally include an inner conductor and an outer conductor extending around the inner conductor. In some configurations, signals are transmitted through the inner conductor, and the outer conductor may be maintained at earth potential.

Conventional cable connector assemblies generally connect the inner conductor and the outer conductor of the coaxial cable to a receiving port of the receiving device.

BRIEF SUMMARY

In some instances, it may be difficult for a user, such as an installation technician, to fully tighten the threads of a connector assembly to the receiving port, which may result in a loose connection between the receiving port and the outer conductor of the coaxial cable. Accordingly, there is a recognized need for coaxial cable connector assemblies with features that facilitate improved electrical connection to the outer conductor of a coaxial cable. The subject matter of the present disclosure addresses this need and presents embodiments including coaxial cable connector assemblies with outer conductor engagement features that assist in making an electrical connection between the outer conductor of a coaxial cable and a receiving port of a device.

In a first aspect A1, the present disclosure provides a coaxial cable connector assembly, comprising a rear body structurally configured to be coupled to a coaxial cable, the rear body comprising an outer body member and an inner body member, wherein the rear body is positionable in a disengaged position in which the outer body member is spaced apart from the inner body member, and an engaged position, in which the outer body member is engaged with the inner body member and at least one of the inner body member and the outer body member deforms inwardly, and a coupler rotatably engaged with and positioned forward of the rear body, wherein the coupler defines an inner channel extending through the coupler between a front portion of the coupler and a rear portion of the coupler positioned opposite the front portion, a thread at the front portion of the coupler, wherein the thread is structurally configured to couple the coaxial cable connector assembly to a port of a device, a nominal portion defining a nominal inner span along the inner channel, and an outer conductor engagement portion that tapers inwardly from the nominal portion that extends forwardly along the inner channel to the front portion of the coupler, wherein the outer conductor engagement portion is structurally configured to contact an outer conductor of the coaxial cable forming an electrical pathway between the thread of the coupler and the outer conductor of the coaxial cable.

In a second aspect A2, the present disclosure provides the coaxial cable connector assembly of aspect A1, wherein the coupler defines a forwardly-facing engagement dome that extends forwardly in an axial direction.

In a third aspect A3, the present disclosure provides the coaxial cable connector assembly of either of aspects A1 or A2, further comprising a retainer engaged with the coupler and the rear body, wherein the retainer couples the rear body to the coupler.

In a fourth aspect A4, the present disclosure provides the coaxial cable connector assembly of aspect A3, wherein the retainer defines a tube portion coaxial with the inner channel of the coupler, and a flange extending outwardly from the tube portion and engaged with the rear body.

In a fifth aspect A5, the present disclosure provides the coaxial cable connector assembly of either of aspects A1 or A2, wherein the rear body defines a cable channel extending through the rear body, and wherein the coaxial cable connector assembly further comprises a post extending at least partially along the cable channel of the rear body.

In a sixth aspect A6, the present disclosure provides the coaxial cable connector assembly of aspect A5, wherein the post defines a post body extending along the cable channel and a post flange that extends outwardly from the post body.

In a seventh aspect A7, the present disclosure provides the coaxial cable connector assembly of aspect A6, further comprising a retainer engaged with the coupler and the rear body wherein the retainer couples the rear body to the coupler, and wherein the post flange abuts the retainer along a longitudinal axis extending between the front portion and the rear portion of the coupler.

In an eighth aspect A8, the present disclosure provides the coaxial cable connector assembly of aspect A6, further comprising a retainer engaged with the coupler and the rear body, the retainer defining a tube portion and a flange extending outward from the tube portion and engaging the rear body, wherein the retainer couples the rear body to the coupler, and wherein the post flange engages the tube portion of the retainer.

In a ninth aspect A9, the present disclosure provides the coaxial cable connector assembly of any of aspects A1-A8, wherein the outer body member comprises an inner portion and an outer portion, and wherein the inner portion is inwardly deformed when the rear body is in the engaged position.

In a tenth aspect A10, the present disclosure provides the coaxial cable connector assembly of any of aspects A1-A8, wherein in the engaged position a taper of the outer body member is engaged with the inner body member and inwardly deforms at least a portion of the inner body member.

In an eleventh aspect A11, the present disclosure provides the coaxial cable connector assembly of aspect A1, wherein the coupler defines a forwardly-facing engagement dome that extends forwardly in an axial direction, the outer body member comprises an inner portion and an outer portion, and wherein the inner portion is inwardly deformed when the rear body is in the engaged position, and the coaxial cable connector assembly further comprises a retainer engaged with the coupler and the rear body, wherein the retainer couples the rear body to the coupler.

In a twelfth aspect A12, the present disclosure provides a coaxial cable connector assembly, comprising a rear body structurally configured to be coupled to a coaxial cable, the rear body defining a cable channel extending through the rear body and wherein the coaxial cable connector assembly comprises an annular press-ring that is selectively insertable within the cable channel to couple the coaxial cable to the rear body, and a coupler rotatably engaged with and positioned forward of the rear body, wherein the coupler defines an inner channel extending through the coupler between a front portion of the coupler and a rear portion of the coupler positioned opposite the front portion, a thread at the front portion of the coupler, wherein the thread is structurally configured to couple the coaxial cable connector assembly to a port of a device, a nominal portion defining a nominal inner span along the inner channel, and an outer conductor engagement portion that tapers inwardly from the nominal portion that extends forwardly along the inner channel to the front portion of the coupler, wherein the outer conductor engagement portion is structurally configured to contact an outer conductor of the coaxial cable forming an electrical pathway between the thread of the coupler and the outer conductor of the coaxial cable.

In a thirteenth aspect A13, the present disclosure provides the coaxial cable connector assembly of aspect A12, further comprising a retainer engaged with the coupler and the rear body, wherein the retainer couples the rear body to the coupler.

In a fourteenth aspect A14, the present disclosure provides the coaxial cable connector assembly of aspect A12, wherein the coaxial cable connector assembly further comprises a post extending at least partially along the cable channel of the rear body.

In a fifteenth aspect A15, the present disclosure provides the coaxial cable connector assembly of aspect A14, wherein the post defines a post body extending along the cable channel and a post flange that extends outwardly from the post body.

In a sixteenth aspect A16, the present disclosure provides the coaxial cable connector assembly of aspect A15, further comprising a retainer engaged with the coupler and the rear body wherein the retainer couples the rear body to the coupler, and wherein the post flange abuts the retainer along a longitudinal axis extending between the front portion and the rear portion of the coupler.

In a seventeenth aspect A17, the present disclosure provides the coaxial cable connector assembly of aspect A15, further comprising a retainer engaged with the coupler and the rear body, the retainer defining a tube portion and a flange extending outward from the tube portion and engaging the rear body, wherein the retainer couples the rear body to the coupler, and wherein the post flange engages the tube portion of the retainer.

In an eighteenth aspect A18, the present disclosure provides a coaxial cable assembly comprising a coaxial cable comprising an inner conductor, a dielectric material surrounding the inner conductor, an outer conductor surrounding the dielectric material, an outer braid positioned outwardly from and engaged with the outer conductor, and an outer jacket surrounding at least a portion of the outer conductor, and a coaxial cable connector assembly comprising a rear body coupled to the coaxial cable, the rear body comprising an outer body member and an inner body member, wherein the rear body is positionable in a disengaged position in which the outer body member is spaced apart from the inner body member, and an engaged position, in which the outer body member is engaged with the inner body member and at least one of the inner body member and the outer body member deforms inwardly, and a coupler rotatably engaged with and positioned forward of the rear body, wherein the coupler defines an inner channel extending through the coupler between a front portion of the coupler and a rear portion of the coupler, a thread at the front portion of the coupler, wherein the thread is structurally configured to couple the coaxial cable connector assembly to a port of a device, a nominal portion defining a nominal inner span along the inner channel, and an outer conductor engagement portion that tapers inwardly from the nominal portion moving forward along the inner channel to the front portion of the coupler, wherein the outer conductor engagement portion contacts the outer conductor of the coaxial cable and forms an electrical pathway between the thread of the coupler and the outer conductor of the coaxial cable.

In a nineteenth aspect A19, the present disclosure provides the coaxial cable assembly of aspect A18, wherein the outer body member comprises an inner portion and an outer portion, and wherein the inner portion is inwardly deformed when the rear body is in the engaged position.

In a twentieth aspect A20, the present disclosure provides the coaxial cable assembly of either of aspects A18 or A19, wherein the outer conductor comprises a conductive foil extending around the dielectric material.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure may be indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments described herein are generally directed to coaxial cable connector assemblies including outer conductor engagement features. In particular, embodiments disclosed herein are directed to coaxial cable connector assemblies including outer conductor engagement features that electrically couple threads of a coupler of the coaxial cable connector assembly to an outer conductor of a coaxial cable. By electrically coupling the outer conductor of the coaxial cable to the threads of the coupler, coaxial cable connector assemblies described herein may make an electrical connection between the port of a device and the outer conductor of the coaxial cable, even if the coupler of the coaxial cable connector assembly is not fully seated on the port of the device. These and other embodiments of coaxial cable connector assemblies are disclosed in greater detail herein with reference to the appended figures.

Figure 1:
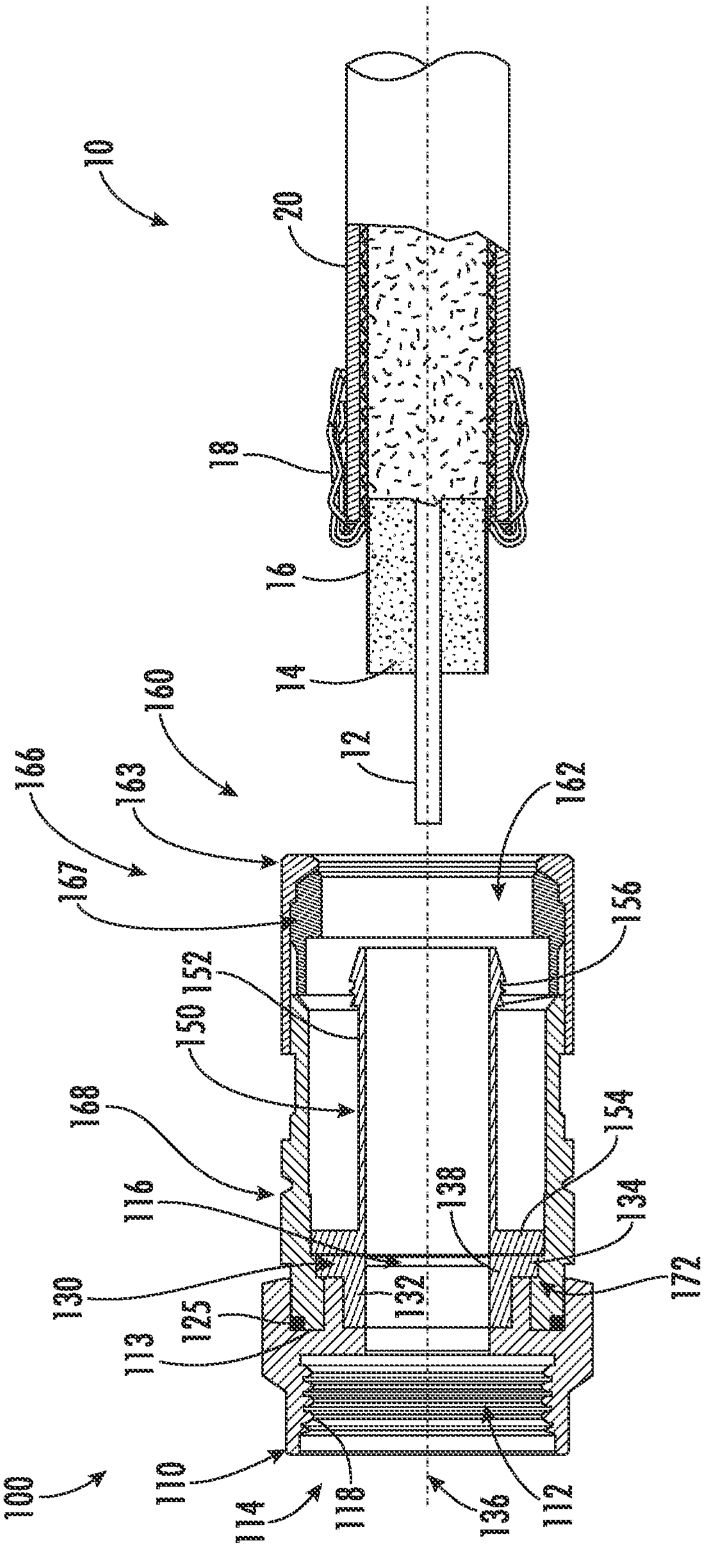
FIG. 1 schematically depicts a section view of coaxial cable connector assembly and a section view of a coaxial cable, according to one or more embodiments shown and described herein.

Referring to FIG. 1, a coaxial cable connector assembly 100 and a coaxial cable 10 are schematically depicted. The coaxial cable connector assembly 100 generally includes a coupler 110 and a rear body 160 positioned rearward of the coupler 110. In embodiments, the coupler 110 is rotatably engaged with the rear body 160, such that the coupler 110 may rotate about the rear body 160. The rear body 160 can be coupled to the coaxial cable 10, as described in greater detail herein.

In embodiments, the coupler 110 defines an inner channel 112 extending between a front portion 114 of the coupler 110 and a rear portion 116 of the coupler 110 positioned opposite the front portion 114. In embodiments, the coupler 110 includes a thread 118 at the front portion 114 of the coupler 110, which is structurally configured to engage a corresponding thread of a port of a device, such as a television, a cable box, or the like. The coupler 110 may be formed of a material suitable to conduct electricity, such as copper, aluminum, or the like, and in embodiments the coupler 110 can be electrically coupled to an outer conductor 16 of the coaxial cable 10.

The coaxial cable 10 generally includes an inner conductor 12 surrounded by a dielectric material 14. In embodiments, electrical signals may be passed through the inner conductor 12, such as to a device connected to the coaxial cable 10, and the inner conductor 12 may be formed of a conductive material, such as copper, aluminum, or the like. The dielectric material 14 generally electrically insulates the inner conductor 12, and may include a polymer or the like. In some embodiments, the dielectric material 14 is generally elastic and may elastically deform under force, thereby allowing the coaxial cable 10 to bend.

In embodiments, the coaxial cable 10 further includes an outer conductor 16 surrounding the dielectric material 14. In some configurations, the outer conductor 16 may be maintained at a ground potential while electrical signals are transmitted through the inner conductor 12. The outer conductor 16 may generally be formed of a conductive material, such as aluminum foil, copper foil, or the like. In some embodiments, the coaxial cable 10 further includes an outer braid 18 positioned outwardly from and engaged with the outer conductor 16. In embodiments, the outer braid 18 may be formed of a conductive material, such as braided copper wire, braided aluminum wire or the like. In embodiments, the outer braid 18 may assist in shielding the inner conductor 12 of the coaxial cable 10.

The coaxial cable 10, in embodiments, further includes an outer jacket 20 surrounding at least a portion of the outer conductor 16 and/or the outer braid 18. The outer jacket 20 may be formed of a polymer or the like and may generally protect the coaxial cable 10 from environmental elements, such as moisture.

Figure 2:
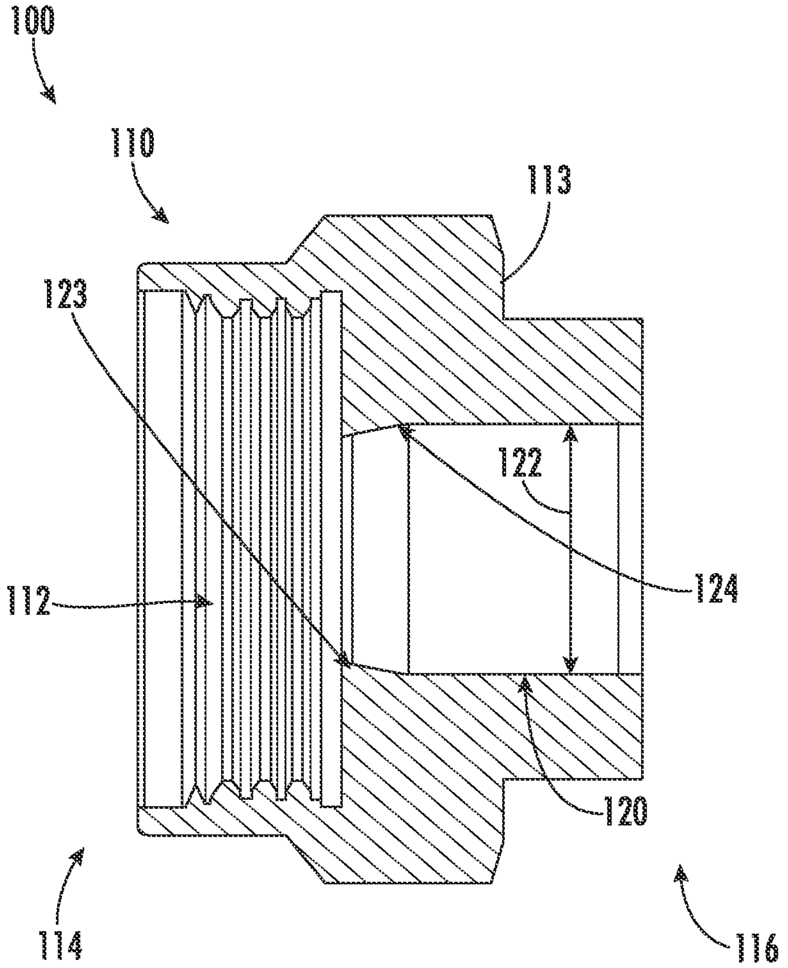
FIG. 2 schematically depicts section view of a coupler of the coaxial cable connector assembly of FIG. 1, according to one or more embodiments shown and described herein.

Referring to FIGS. 1 and 2, a section view of the coupler 110 is depicted. In some embodiments, the coupler 110 defines a nominal portion 120 defining a nominal inner span 122 extending along the inner channel 112. The nominal portion 120 is referenced herein as being "nominal" to help distinguish it from the various distinctive features defined on the inner channel 112. Without these distinctive surface features, the nominal portion 120 would form a relatively uniform and continuous surface of the coupler 110.

In embodiments, the coupler 110 defines an outer conductor engagement portion 124 that tapers inwardly from the nominal portion 120. In particular, in the embodiment depicted in FIGS. 1 and 2, the outer conductor engagement portion 124 defines a taper that extends forward along the inner channel 112 toward the front portion 114 of the coupler 110. In embodiments, the outer conductor engagement portion 124 is structurally configured to contact the outer conductor 16 of the coaxial cable 10, forming an electrical pathway between the thread 118 of the coupler 110 and the outer conductor 16 of the coaxial cable 10. While the outer conductor engagement portion 124 is described as contacting the outer conductor 16, it should be understood that in some embodiments, the coupler 110 may also engage the outer braid 18 of the coaxial cable 10. In some embodiments, the coupler 110 further defines a lip 123 at the front end of the outer conductor engagement portion 124. The lip 123, in some embodiments, extends inwardly from the outer conductor engagement portion 124, and may restrict insertion of the coaxial cable 10 beyond the lip 123.

In some embodiments, a span of the outer conductor engagement portion 124 is less than a span of the outer conductor 16 of the coaxial cable 10. In these embodiments, as the coaxial cable 10 is inserted into the coupler 110, the outer conductor engagement portion 124 may at least partially and inwardly deform the outer conductor 16 and/or the dielectric material 14 as the outer conductor 16 of the coaxial cable 10 engages the outer conductor engagement portion 124 of the coupler 110. As described above, the dielectric material 14 may include a generally elastic material, and accordingly, as the outer conductor 16 and/or the dielectric material 14 are inwardly deformed by the outer conductor engagement portion 124, the dielectric material 14 may elastically bias the outer conductor 16 outwardly, which may assist in maintaining physical contact between the outer conductor 16 of the coaxial cable 10 and the outer conductor engagement portion 124 of the coupler 110. By maintaining physical contact between the outer conductor 16 of the coaxial cable 10 and the outer conductor engagement portion 124 of the coupler 110, electrical communication between the outer conductor 16 and the coupler 110 may be maintained.

Referring to FIG. 1, in some embodiments, the coaxial cable connector assembly 100 includes a retainer 130 engaged with the coupler 110 and the rear body 160, and generally couples the coupler 110 to the rear body 160. In embodiments, the retainer 130 generally defines a tube portion 132 coaxial with the inner channel 112 of the coupler 110, and a flange 134 that extends outwardly from the tube portion 132 and is at least partially engaged with the rear body 160. For example, in some embodiments, the rear body 160 defines a cable channel 162 extending through the rear body 160, and the coaxial cable 10 is insertable through the cable channel 162 of the rear body 160. In the embodiment depicted in FIG. 1, the rear body 160 defines an annular ridge 172 that extends inwardly along the cable channel 162. The flange 134 of the retainer 130, in some embodiments, engages the annular ridge 172 of the rear body 160, thereby restricting axial movement of the rear body 160 with respect to the retainer 130.

In some embodiments, the tube portion 132 of the retainer 130 is engaged with the coupler 110, and in some embodiments, the tube portion 132 of the retainer 130 is coupled to the coupler 110. In embodiments, the tube portion 132 of the retainer 130 may be coupled to the coupler 110 in any suitable fashion, for example and without limitation, the retainer 130 may be coupled to the coupler 110 via a press-fit interference, via structural adhesives, or the like.

In some embodiments, the coupler 110 defines a rear body face 113 oriented rearwardly towards the rear body 160. In embodiments, when the coaxial cable connector assembly 100 is assembled, the rear body 160 may be captured between the rear body face 113 of the coupler 110 and the flange 134 of the retainer 130, thereby restricting axial movement between the coupler 110 and the rear body 160. In some embodiments, the coaxial cable connector assembly 100 may include a sealing element 125 positioned between the coupler 110 and the rear body 160, such as an o-ring or the like. In embodiments, the sealing element 125 may restrict environmental elements, such as moisture or the like from reaching the inner channel 112 of the coupler 110.

In some embodiments, the retainer 130 defines an annular bevel 138 positioned between the flange 134 and the tube portion 132. In embodiments, the annular bevel 138 is oriented inwardly toward a longitudinal axis 136 extending through the coupler 110.

In the embodiment depicted in FIG. 1, the coaxial cable connector assembly 100 includes a post 150 extending at least partially along the cable channel 162. In embodiments, the post 150 generally defines a post body 152 that extends along the cable channel 162 and a post flange 154 that extends outwardly from the post body 152. In embodiments, the post body 152 is structurally configured to be inserted between the outer braid 18 and the outer conductor 16 of the coaxial cable 10. The post 150, in some embodiments, includes a barb 156 or the like extending outwardly from the post body 152. The barb 156 may engage the outer braid 18 of the coaxial cable 10, and may assist in restricting axial movement of the coaxial cable 10 with respect to the post 150. In the embodiment depicted in FIG. 1, the post flange 154 abuts the retainer 130 along the longitudinal axis 136. In some embodiments, the coaxial cable connector assembly 100 does not include the post 150.

Figure 3:
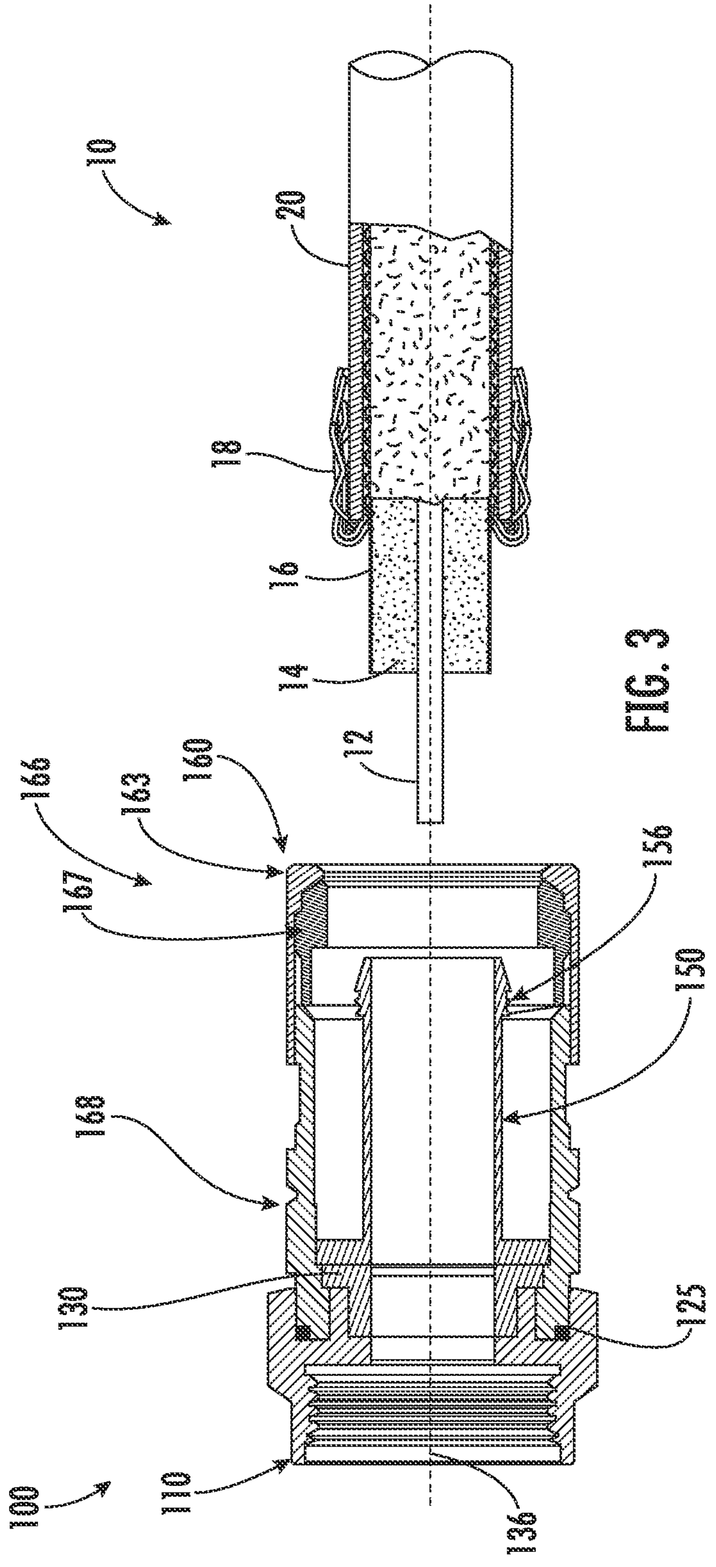
FIG. 3 schematically depicts a section view of the coaxial cable of FIG. 1 approaching the coaxial cable connector assembly of FIG. 1, according to one or more embodiments shown and described herein.
Figure 4:
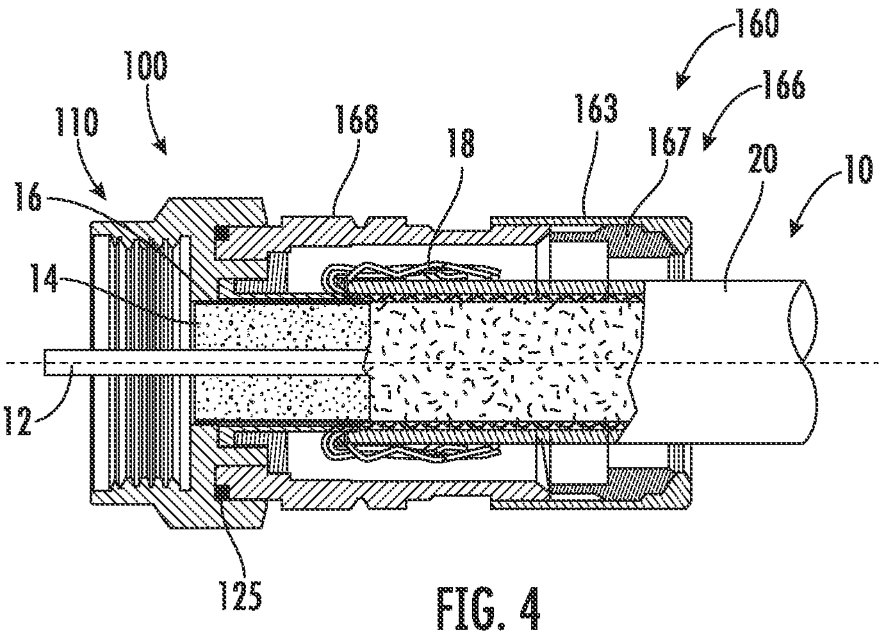
FIG. 4 schematically depicts a section view of the coaxial cable of FIG. 1 engaged with the coaxial cable connector assembly of FIG. 1, according to one or more embodiments shown and described herein.

Referring to FIGS. 3 and 4, a section view of the coaxial cable 10 and the coaxial cable connector assembly 100 are depicted in a disengaged position (FIG. 3) with the coaxial cable 10 approaching the coaxial cable connector assembly 100, and an engaged position (FIG. 4) with the coaxial cable 10 at least partially inserted into the coaxial cable connector assembly 100. In embodiments, the rear body 160 includes an inner body member 168 and an outer body member 166 positioned radially outwardly from the inner body member 168. In embodiments, the rear body 160 is positionable in a disengaged position in which the outer body member 166 is spaced apart from the inner body member 168, and an engaged position, in which the outer body member 166 is engaged with the inner body member 168 and at least one of the inner body member 168 and the outer body member 166 deforms inwardly.

For example, in embodiments, the outer body member 166 includes an outer portion 163 structurally configured to slide over the inner body member 168, and an inner portion 167 structurally configured to slide inside the inner body member 168. In embodiments, when the rear body 160 is in the engaged position, the inner portion 167 is inwardly deformed. In particular, as the outer body member 166 moves forward, the inner portion 167 of the outer body member 166 engages the inner body member 168 and deforms inwardly. By deforming inwardly, the inner portion 167 of the outer body member 166 may engage the outer jacket 20 of the coaxial cable 10, thereby coupling the coaxial cable 10 to the rear body 160 and accordingly to the coaxial cable connector assembly 100.

Figure 5:
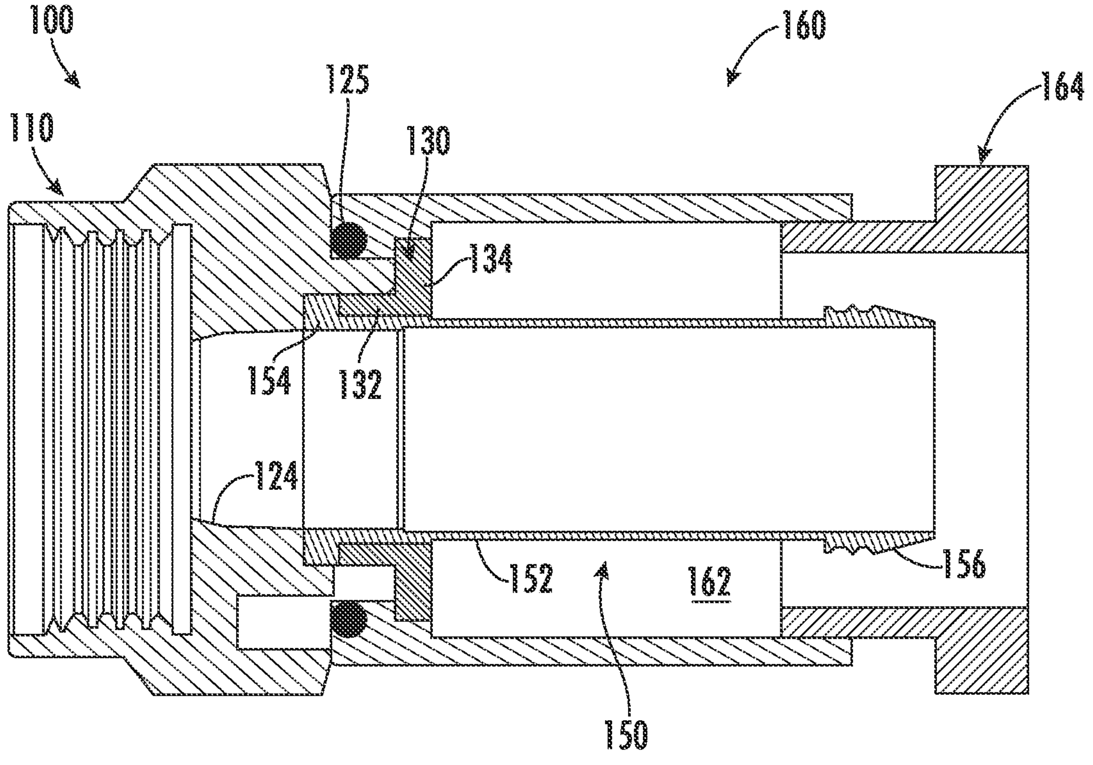
FIG. 5 schematically depicts a section view of another coaxial cable connector assembly, according to one or more embodiments shown and described herein.

Referring to FIG. 5, a section view of another coaxial cable connector assembly 100 is schematically depicted. Like the embodiment described above and depicted in FIGS. 1-4, the coaxial cable connector assembly 100 includes the coupler 110 and the rear body 160. However, in the embodiment depicted in FIG. 5, the coaxial cable connector assembly 100 includes annular press-ring 164 selectively insertable within the cable channel 162 to couple the coaxial cable 10 (FIG. 1) to the rear body 160. In particular, the annular press-ring 164 may generally reduce the inner span of the cable channel 162 of the rear body 160 and may be compressed between the coaxial cable 10 (FIG. 1) and the rear body 160, thereby coupling the coaxial cable 10 (FIG. 1) to the rear body 160 and accordingly the coaxial cable connector assembly 100.

Further in the embodiment depicted in FIG. 5, the coaxial cable connector assembly 100 includes the post 150 defining the post body 152 and the post flange 154. However, in the embodiment depicted in FIG. 5, the post flange 154 engages the tube portion 132 of the retainer 130, thereby restricting movement of the post 150 with respect to the retainer 130, and accordingly the coupler 110.

Figure 6:
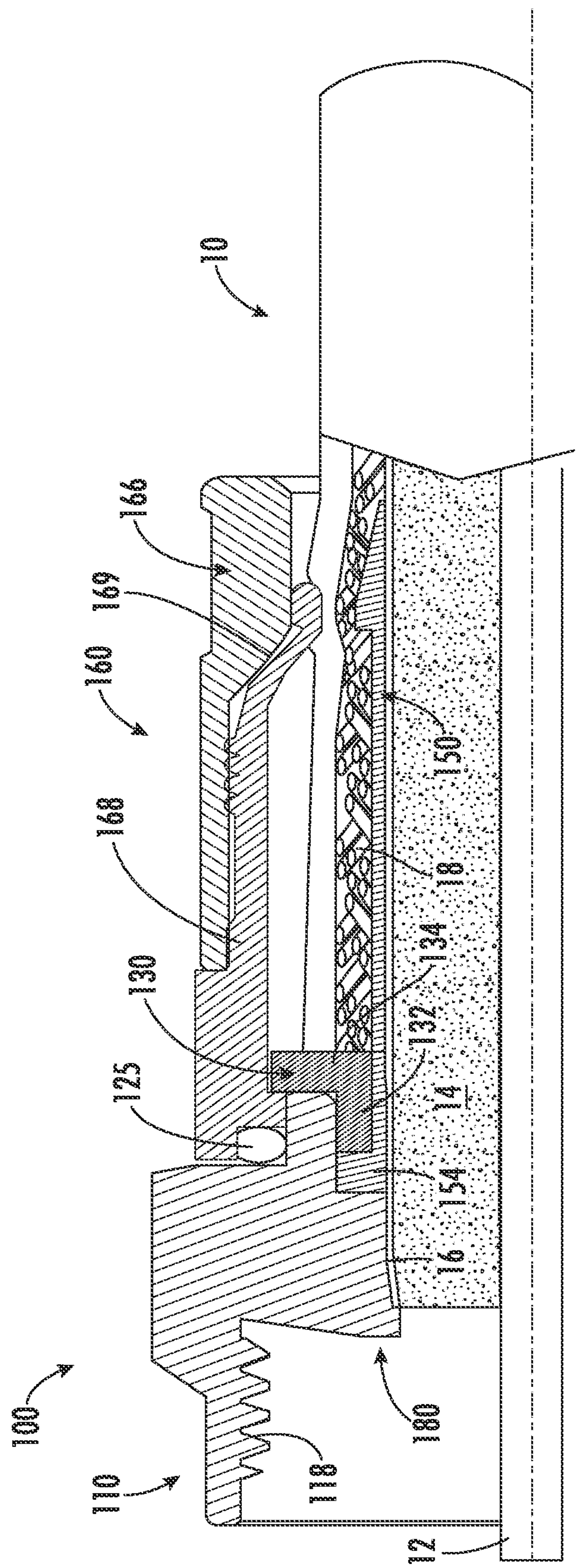
FIG. 6 schematically depicts a section view of another coaxial cable connector assembly, according to one or more embodiments shown and described herein.

Referring to FIG. 6, another embodiment of a coaxial cable connector assembly 100 is schematically depicted. Like the embodiments described above and depicted in FIGS. 1-5, the coaxial cable connector assembly 100 includes the coupler 110 and the rear body 160. However, in the embodiment depicted in FIG. 6, the coupler 110 defines a forwardly-facing engagement dome 180. In embodiments, the forwardly-facing engagement dome 180 extends forwardly in an axial direction and may assist in making contact with a port of a device, electrically coupling the coupler 110, and accordingly the outer conductor 16, to the port.

Further, in the embodiment depicted in FIG. 6, the rear body 160 includes the outer body member 166 and the inner body member 168 positioned inwardly from the outer body member 166. In the embodiment depicted in FIG. 6, the outer body member 166 defines a taper 169 that is engageable with the inner body member 168 to inwardly deform at least a portion of the inner body member 168. By inwardly deforming at least a portion of the inner body member 168, the at least a portion of the inner body member 168 engages the outer jacket 20 of the coaxial cable 10, thereby coupling the coaxial cable 10 to the coaxial cable connector assembly 100.

Accordingly, it should now be understood that embodiments described herein are directed coaxial cable connector assemblies including outer conductor engagement features. In particular, embodiments disclosed herein are directed to coaxial cable connector assemblies including outer conductor engagement features that electrically couple threads of a coupler of the coaxial cable connector assembly to an outer conductor of a coaxial cable. By electrically coupling the outer conductor of the coaxial cable to the threads of the coupler, coaxial cable connector assemblies described herein may make an electrical connection between the port of a device and the outer conductor of the coaxial cable, even if the coupler of the coaxial cable connector assembly is not fully seated on the port of the device.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A coaxial cable connector assembly, comprising:

a rear body structurally configured to be coupled to a coaxial cable, the rear body comprising an outer body member and an inner body member, wherein the rear body is positionable in a disengaged position in which the outer body member is spaced apart from the inner body member, and an engaged position, in which the outer body member is engaged with the inner body member and at least one of the inner body member and the outer body member deforms inwardly; and a coupler rotatably engaged with and positioned forward of the rear body, wherein the coupler defines:

an inner channel extending through the coupler between a front portion of the coupler and a rear portion of the coupler positioned opposite the front portion;

a thread at the front portion of the coupler, wherein the thread is structurally configured to couple the coaxial cable connector assembly to a port of a device;

a nominal portion defining a nominal inner span along the inner channel; and an outer conductor engagement portion that tapers inwardly from the nominal portion that extends forwardly along the inner channel to the front portion of the coupler, wherein the outer conductor engagement portion is structurally configured to contact an outer conductor of the coaxial cable forming an electrical pathway between the thread of the coupler and the outer conductor of the coaxial cable.

2. The coaxial cable connector assembly of claim 1, wherein the coupler defines a forwardly-facing engagement dome that extends forwardly in an axial direction.

3. The coaxial cable connector assembly of claim 1, further comprising a retainer engaged with the coupler and the rear body, wherein the retainer couples the rear body to the coupler.

4. The coaxial cable connector assembly of claim 3, wherein the retainer defines:

a tube portion coaxial with the inner channel of the coupler; and a flange extending outwardly from the tube portion and engaged with the rear body.

5. The coaxial cable connector assembly of claim 1, wherein the rear body defines a cable channel extending through the rear body, and wherein the coaxial cable connector assembly further comprises a post extending at least partially along the cable channel of the rear body.

6. The coaxial cable connector assembly of claim 5, wherein the post defines a post body extending along the cable channel and a post flange that extends outwardly from the post body.

7. The coaxial cable connector assembly of claim 6, further comprising a retainer engaged with the coupler and the rear body wherein the retainer couples the rear body to the coupler, and wherein the post flange abuts the retainer along a longitudinal axis extending between the front portion and the rear portion of the coupler.

8. The coaxial cable connector assembly of claim 6, further comprising a retainer engaged with the coupler and the rear body, the retainer defining a tube portion and a flange extending outward from the tube portion and engaging the rear body, wherein the retainer couples the rear body to the coupler, and wherein the post flange engages the tube portion of the retainer.

9. The coaxial cable connector assembly of claim 1, wherein the outer body member comprises an inner portion and an outer portion, and wherein the inner portion is inwardly deformed when the rear body is in the engaged position.

10. The coaxial cable connector assembly of claim 1, wherein in the engaged position a taper of the outer body member is engaged with the inner body member and inwardly deforms at least a portion of the inner body member.

11. The coaxial cable connector assembly of claim 1, wherein:

the coupler defines a forwardly-facing engagement dome that extends forwardly in an axial direction;

the outer body member comprises an inner portion and an outer portion, and wherein the inner portion is inwardly deformed when the rear body is in the engaged position; and the coaxial cable connector assembly further comprises a retainer engaged with the coupler and the rear body, wherein the retainer couples the rear body to the coupler.

12. A coaxial cable connector assembly, comprising:

a rear body structurally configured to be coupled to a coaxial cable, the rear body defining a cable channel extending through the rear body and wherein the coaxial cable connector assembly comprises an annular press-ring that is selectively insertable within the cable channel to couple the coaxial cable to the rear body; and a coupler rotatably engaged with and positioned forward of the rear body, wherein the coupler defines:

an inner channel extending through the coupler between a front portion of the coupler and a rear portion of the coupler positioned opposite the front portion;

a thread at the front portion of the coupler, wherein the thread is structurally configured to couple the coaxial cable connector assembly to a port of a device;

a nominal portion defining a nominal inner span along the inner channel; and an outer conductor engagement portion that tapers inwardly from the nominal portion that extends forwardly along the inner channel to the front portion of the coupler, wherein the outer conductor engagement portion is structurally configured to contact an outer conductor of the coaxial cable forming an electrical pathway between the thread of the coupler and the outer conductor of the coaxial cable.

13. The coaxial cable connector assembly of claim 12, further comprising a retainer engaged with the coupler and the rear body, wherein the retainer couples the rear body to the coupler.

14. The coaxial cable connector assembly of claim 12, wherein the coaxial cable connector assembly further comprises a post extending at least partially along the cable channel of the rear body.

15. The coaxial cable connector assembly of claim 14, wherein the post defines a post body extending along the cable channel and a post flange that extends outwardly from the post body.

16. The coaxial cable connector assembly of claim 15, further comprising a retainer engaged with the coupler and the rear body wherein the retainer couples the rear body to the coupler, and wherein the post flange abuts the retainer along a longitudinal axis extending between the front portion and the rear portion of the coupler.

17. The coaxial cable connector assembly of claim 15, further comprising a retainer engaged with the coupler and the rear body, the retainer defining a tube portion and a flange extending outward from the tube portion and engaging the rear body, wherein the retainer couples the rear body to the coupler, and wherein the post flange engages the tube portion of the retainer.

* * * * *